(12) United States Patent
Je et al.

(10) Patent No.: US 11,599,870 B2
(45) Date of Patent: Mar. 7, 2023

(54) METHOD AND APPARATUS FOR DETERMINING DEVICE FOR PAYMENT IN MULTIPLE ELECTRONIC DEVICES

(71) Applicant: SAMSUNG ELECTRONICS CO., LTD., Suwon-si (KR)

(72) Inventors: Seongmin Je, Suwon-si (KR); Dongun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 16/668,363

(22) Filed: Oct. 30, 2019

(65) Prior Publication Data
US 2020/0134602 A1    Apr. 30, 2020

(30) Foreign Application Priority Data
Oct. 31, 2018   (KR) .................. 10-2018-0132118

(51) Int. Cl.
*G06Q 20/32* (2012.01)
*G06Q 20/10* (2012.01)
(Continued)

(52) U.S. Cl.
CPC ......... *G06Q 20/3278* (2013.01); *G06Q 20/10* (2013.01); *G06Q 20/322* (2013.01);
(Continued)

(58) Field of Classification Search
CPC .. G06Q 20/3278; G06Q 20/10; G06Q 20/322; G06Q 20/382; G06Q 20/40
(Continued)

(56) References Cited

U.S. PATENT DOCUMENTS 8,750,901 B1   6/2014  Gupta et al.
9,038,894 B2   5/2015  Khalid
(Continued)

FOREIGN PATENT DOCUMENTS

EP   3 190 557      7/2017
KR   10-1635320    6/2016
(Continued)

OTHER PUBLICATIONS

Katiyar et al., Integrating contactless Near Field Communication and Context-Aware systems: Improved Internet-of-Things and Cyberphysical system, 2014, 2014 5th International Conference—Confluence the Next Generation Information Technology Summit, 365-372 (Year: 2014).*

(Continued)

*Primary Examiner* — Hani M Kazimi
*Assistant Examiner* — Alison L. Lamb
(74) *Attorney, Agent, or Firm* — Nixon & Vanderhye P.C.

(57) ABSTRACT

Disclosed are a method and an apparatus in which an electronic device, which does not have a payment function, determines an electronic device most suitable for a current situation among neighboring electronic devices having a payment function, and can provide the determined electronic device to user. According to various embodiments, a server may generate a list comprising information on payment-capable devices related to an account of a user associated with a first electronic device. The list may be generated based on a priority for the payment-capable devices. The list may be transmitted to the first electronic device and a signal for selection of one of the payment-capable devices included in the list may be received from the first electronic device. A signal comprising information related to payment may be transmitted to the selected payment-capable device.

17 Claims, 15 Drawing Sheets

(51) Int. Cl.
  *G06Q 20/38* (2012.01)
  *G06Q 20/40* (2012.01)
(52) U.S. Cl.
  CPC ........... *G06Q 20/326* (2020.05); *G06Q 20/38* (2013.01); *G06Q 20/382* (2013.01); *G06Q 20/40* (2013.01)
(58) Field of Classification Search
  USPC ........................................................ 705/39
  See application file for complete search history.

(56) References Cited

U.S. PATENT DOCUMENTS

| | | | | |
|---|---|---|---|---|
| 2013/0210393 | A1* | 8/2013 | Hillier | H04W 4/021 455/456.1 |
| 2014/0025513 | A1* | 1/2014 | Cooke | G06Q 20/10 705/17 |
| 2017/0150227 | A1 | 5/2017 | Kim et al. | |
| 2017/0186015 | A1 | 6/2017 | Jin et al. | |
| 2017/0201524 | A1* | 7/2017 | Dureau | H04N 21/25841 |
| 2017/0213212 | A1* | 7/2017 | Dicker | G06Q 20/3223 |
| 2018/0121905 | A1 | 5/2018 | Escobedo et al. | |
| 2018/0130054 | A1 | 5/2018 | Choi | |
| 2018/0268387 | A1* | 9/2018 | Bradley | G06Q 20/321 |
| 2020/0134602 | A1* | 4/2020 | Je | G06Q 20/382 |

FOREIGN PATENT DOCUMENTS

| | | | |
|---|---|---|---|
| KR | 10-2017-0062807 | 6/2017 | |
| KR | 10-2017-0105457 | 9/2017 | |
| KR | 10-2017-0133945 | 12/2017 | |
| WO | WO-2015183412 A1 * | 12/2015 | ......... G06K 7/10831 |
| WO | 2018/169686 | 9/2018 | |

OTHER PUBLICATIONS

International Search Report dated Feb. 10, 2020 in counterpart International Patent Application No. PCT/KR2019/014589.
Extended Search Report dated Feb. 19, 2020 in counterpart European Patent Application No. 19206313.9.

* cited by examiner

METHOD AND APPARATUS FOR DETERMINING DEVICE FOR PAYMENT IN MULTIPLE ELECTRONIC DEVICES

CROSS-REFERENCE TO RELATED APPLICATION

This application is based on and claims priority under 35 U.S.C. § 119 to Korean Patent Application No. 10-2018-0132118, filed on Oct. 31, 2018, in the Korean Intellectual Property Office, the disclosure of which is incorporated by reference herein in its entirety.

BACKGROUND

1) Field

The disclosure relates to a method and an apparatus capable of determining a payment electronic device which is most suitable for a current situation among neighboring electronic devices each having a payment function (or capable of performing payment) in an electronic device which does not have a payment function.

2) Description of Related Art

With the advancement of digital technology, wide use is made of various types of electronic devices, such as mobile communication terminals, smart phones, tablet personal computers (PCs), laptops, personal digital assistants (PDAs), wearable devices, digital cameras, smart speakers, or various home appliances (e.g., television sets (TVs), refrigerators, washing machines, cleaners, microwave ovens, or air cleaners).

An electronic device may be implemented in the form of a multifunctional multimedia device (multimedia player). For example, an electronic device may provide a call function such as a voice call or a video call, a message transmission/reception function such as a short message service (SMS)/multimedia message service (MMS) or an email, an electronic organizer function, an image-capturing function, a broadcast reproduction function, a moving-image reproduction function, a music reproduction function, an Internet function, a messenger function, a game function, a social network service (SNS) function, or the like. Recently, an electronic device provides an electronic payment function including mobile payment. According to an embodiment, if a user purchases a product (or an article) through web shopping (or Internet shopping) or home shopping, the user may pay for the product through an electronic card (or an application card) registered in an electronic payment service (or a payment application) using an electronic device.

However, if a user desires to purchase a product while using an electronic device (e.g., a TV or a tablet PC) which does not have a payment function (e.g., watching a home shopping program or browsing web shopping sites), the user may use an external electronic device (or another electronic device) capable of performing payment. For example, if the user desires to purchase a product which is currently on sale in a home shopping program being broadcast on TV, the user may use an electronic device having a payment application installed therein. In this example, the user is inconvenienced in that the user needs to search for the relevant dealer and product again using the found electronic device and proceed with a purchase. Moreover, if an electronic device capable of performing payment is unavailable around the user, the user is inconvenienced in that the user needs to move in person and find the relevant electronic device in order to use the same. Further, if there are multiple electronic devices capable of performing payment or multiple cards for payment, the user may fail to easily recognize locations of the relevant electronic devices or various types of the cards and easily select an appropriate electronic device or card, and thus although the user can make a purchase with better benefit (e.g., discount or points), the user may proceed with payment without recognizing this situation.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method and an apparatus which, based on a user purchasing a product, allow multiple electronic devices to interwork with one another, and thus allow the user to perform electronic payment through an electronic device which is most suitable to purchase the product.

Another example aspect of the disclosure is to provide a method and an apparatus which, if a user makes a payment request using a first electronic device, can select a second electronic device which is more suitable for paying for a product among neighboring electronic devices capable of performing payment, and thus can provide related information to the user.

Still another example aspect of the disclosure is to provide a method and an apparatus which, if a user purchases a product using an electronic device, enable the user to perform more efficient payment by providing the user with information on a neighboring electronic device which is more suitable for paying for the product.

In accordance with an example aspect of the disclosure, a system may include: at least two electronic devices, each comprising a communication interface comprising communication circuitry; at least one processor operatively connected to the communication interface; and at least one memory electrically connected to the processor, wherein the memory is configured to store instructions that, when executed by the processor, control one of the at least two electronic devices to: receive a first signal including information on a payment request and context information related to a first electronic device, the first electronic device not having a payment function, from the first electronic device through the communication interface; identify at least one second electronic device having a payment function and related to an account of the user in response to receiving the first signal; transmit a second signal including information on the at least one second electronic device to the first electronic device through the communication interface; receive a third signal for selection of one of the at least one second electronic device through the communication interface; and transmit a fourth signal including information related to payment to the selected second electronic device, based at least in part on the third signal.

In accordance with another example aspect of the disclosure, an electronic device may include: a communication interface comprising communication circuitry; a display; at least one processor operatively connected to the display and the communication interface; and at least one memory electrically connected to the processor, wherein the memory is configured to store instructions that, when executed by the processor, control the electronic device to: display, on the display, a content and a user interface configured to receive a payment request related to the content; receive a first input related to the payment request through the user interface; transmit information related to the first input to an external server through the communication interface; receive, from the external server, a list of at least one external electronic device having a payment function and related to an account of a user; display the list on the display; receive a second input for selection of one external electronic device among the at least one external electronic device of the list; and transmit information on the second input to the external server through the communication interface.

In accordance with still another example aspect of the disclosure, an operating method of an electronic device may include: receiving a first signal including information on a payment request and context information related to a first electronic device, the first electronic device not having a payment function, from the first electronic device; identifying at least one second electronic device having a payment function and related to an account of a user in response to receiving the first signal; transmitting a second signal including information on the at least one second electronic device to the first electronic device; receiving a third signal for selection of one of the at least one second electronic device through a communication interface; and transmitting a fourth signal including information related to payment to the selected second electronic device, based at least in part on the third signal.

In order to address the above-mentioned technical problem, various example embodiments may provide a computer-readable recording medium on which a program, which, when executed by a processor, causes an electronic device or system to perform the method, is recorded.

According to various example embodiments, if a user purchases a product online, an electronic device and an operating method thereof allow multiple electronic devices to interwork with one another, and thus enable the user to perform electronic payment through an electronic device which is suitable to purchase the product. According to various example embodiments, if a user makes a payment request using one electronic device among multiple electronic devices in a predetermined space, an electronic device and an operating method thereof can verify neighboring electronic devices capable of performing payment, can select at least one payment electronic device which is more suitable for paying for a product among the electronic devices capable of performing payment, and thus can provide related information to the user through the electronic device being used by the user. By this configuration, the user can easily verify information on electronic devices (or cards) capable of paying for a product, and can select an electronic device, which is more suitable for paying for the product, to perform payment. According to various example embodiments, information on an optimal and/or more suitable payment electronic device can be provided through an electronic device used by a user, and thus inconvenience of searching for an electronic device or moving by the user may be resolved. According to various example embodiments, when a user pays for a product online, the usability, convenience, accessibility, and/or reliability of an electronic device can be improved.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
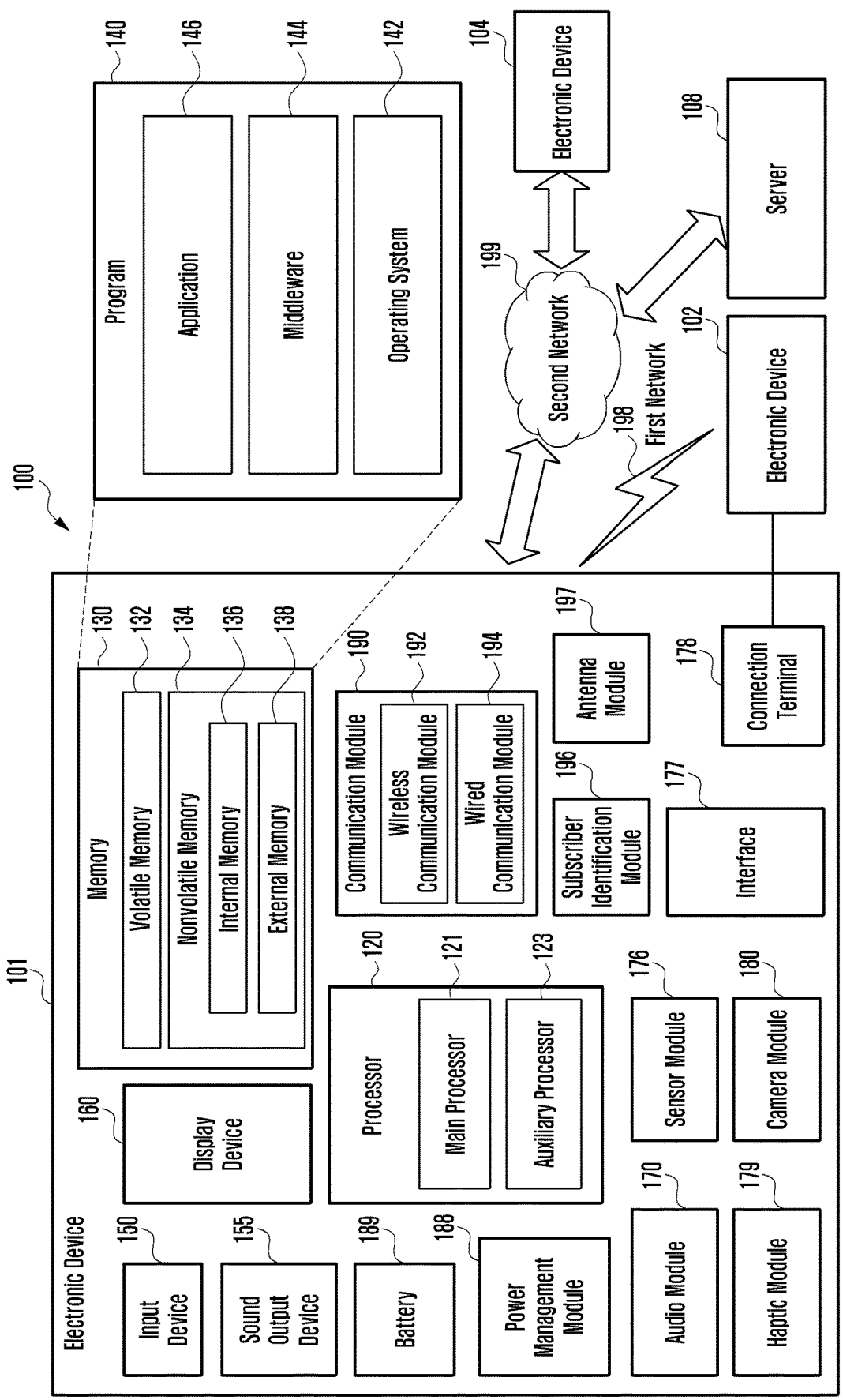
FIG. 1 is a block diagram illustrating an example configuration of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., over wires), wirelessly, or via a third element.

As used herein, the term "module" may include a unit implemented in hardware, software, or firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
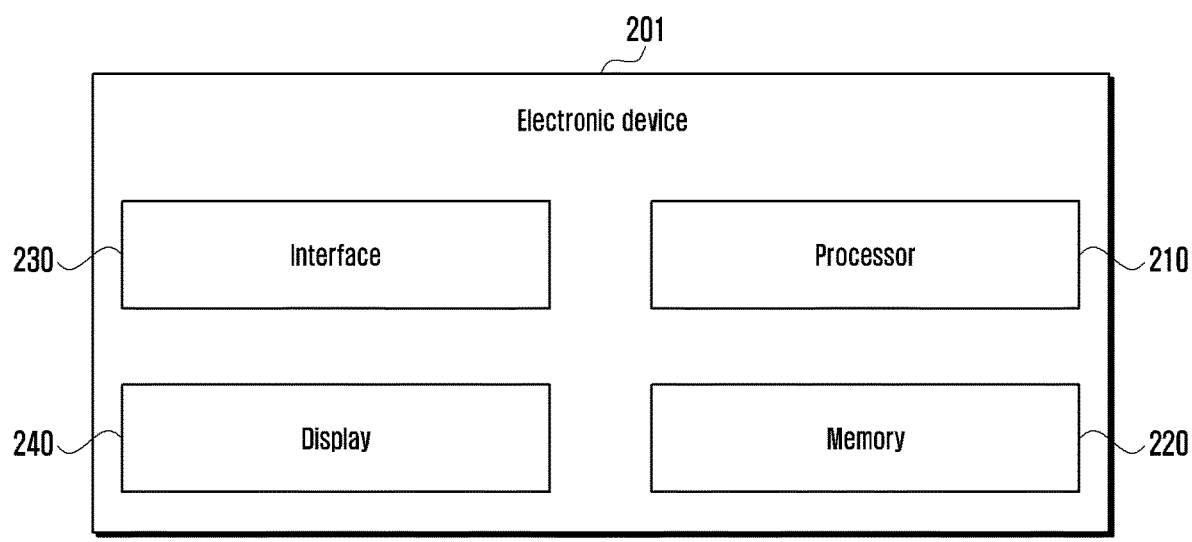
FIG. 2 is a block diagram illustrating an example configuration of an external electronic device according to various embodiments.

FIG. 2 is a block diagram illustrating an example configuration of an external electronic device 201 according to various embodiments.

For example, FIG. 2 may be a block diagram illustrating a configuration of the electronic device 201 (e.g., a TV, a tablet, or a PC) which does not have a payment function in various embodiments. Although illustrated by way of example in FIG. 2, the electronic device 201 may include all or some of the elements of the electronic device 101 illustrated in FIG. 1. For example, the electronic device 201 may be of a type identical or similar to, or different from, that of the electronic device 101 illustrated in FIG. 1.

Referring to FIG. 2, the electronic device 201 may include a processor (e.g., including processing circuitry) 210, a memory 220, a communication interface (e.g., including communication circuitry) 230, and a display 240.

According to various embodiments, all or some of operations of the processor 210, the memory 220, the communication interface 230, and the display 240 of the electronic device 201 may correspond to operations of the related elements (e.g., the processor 120, the memory 130, the communication module 190, and the display 160 of FIG. 1) in the electronic device 101 of FIG. 1.

According to an embodiment, the processor 210 may be operatively connected to the communication interface 230 and the display 240. According to an embodiment, the processor 210 may be electrically connected to the memory 220. According to an embodiment, the processor 210 may execute software to control at least one (e.g., a hardware or software element) of the other elements of the electronic device 201 connected to the processor 210, and may process various types of data or perform various arithmetic operations. According to an embodiment, as at least some of data processing operations or arithmetic operations, the processor 210 may load, into the memory 220, commands or data received from an element (e.g., the communication interface 230) other than the processor 210, may process commands or data stored in the memory 220, and may store, in the memory 220, data resulting from the processing. In the following description, where the processor is recited as controlling various functions, it will be understood that the disclosure is not limited to the processor directly controlling the various functions. For example, the processor may control an electronic device (including components thereof) to perform the various functions, and the disclosure is not limited to the processor itself performing the various functions.

According to various embodiments, the processor 210 may include various processing circuitry and control an operation of acquiring, from an external device (e.g., an external server), information on neighboring electronic devices having a payment function (or capable of performing payment) in response to a payment request of a user, and providing (or displaying) the same. According to an embodiment, the processor 120 may control an electronic device to display, on the display 240, a user interface configured to receive a content and a payment request related to a content. According to an embodiment, the processor 120 may control an electronic device to detect reception of a first user input related to a payment request through the user interface displayed on the display 240. According to an embodiment, the processor 120 may control an electronic device to transmit information related to the first user input to an external server through the communication interface 230 based on the reception of the first user input. According to an embodiment, the information related to the first user input may include information on a payment request of the user and context information related to the electronic device 201. According to an embodiment, the processor 120 may control an electronic device to receive, from an external server, a list of at least one external electronic device which is related to an account of the user and has a payment function, and may display the received list on the display 240. According to an embodiment, if the received list is displayed on the display 240, the processor 120 may control an electronic device to display the received list based on a priority related to the at least one external electronic device. According to an embodiment, the processor 120 may control an electronic device to detect reception of a second user input for selection of one external electronic device (e.g., the electronic device 101 of FIG. 1) from the at least one external electronic device of the list. According to an embodiment, the processor 120 may control an electronic device to transmit, to an external server, information on the second user input through the communication interface 230 based on the reception of the second user input. According to an embodiment, the information on the second user input may include information on an external electronic device selected according to the second user input from among the at least one external electronic device, and information related to payment by the selected external electronic device.

According to an embodiment, the memory 220 may store various data used by at least one element (e.g., the processor 210) of the electronic device 201. Data may include, for example, software (e.g., the program 140 of FIG. 1) and input data for commands related to the software or output data for the commands. The memory 220 may include a volatile memory and/or a non-volatile memory. According to an embodiment, the memory 220 may store a module (e.g., a process or a function) configured to perform a function according to various embodiments, and a module stored in the memory 220 may be executed by the processor 220.

According to an embodiment, the communication interface 230 may include various communication circuitry and establish a wireless communication channel between the electronic device 201 and an external device (e.g., an external server, an external electronic device, or a remote control device), and may perform wireless communication through the established communication channel.

According to an embodiment, the display 240 may visually provide (or display) information to the exterior (e.g., a user) of the electronic device 201. According to an embodiment, the display 240 may also include a touch circuit configured to detect a touch, or a sensor circuit (e.g., a pressure sensor) configured to measure the amount of force generated by a touch.

Figure 3A:
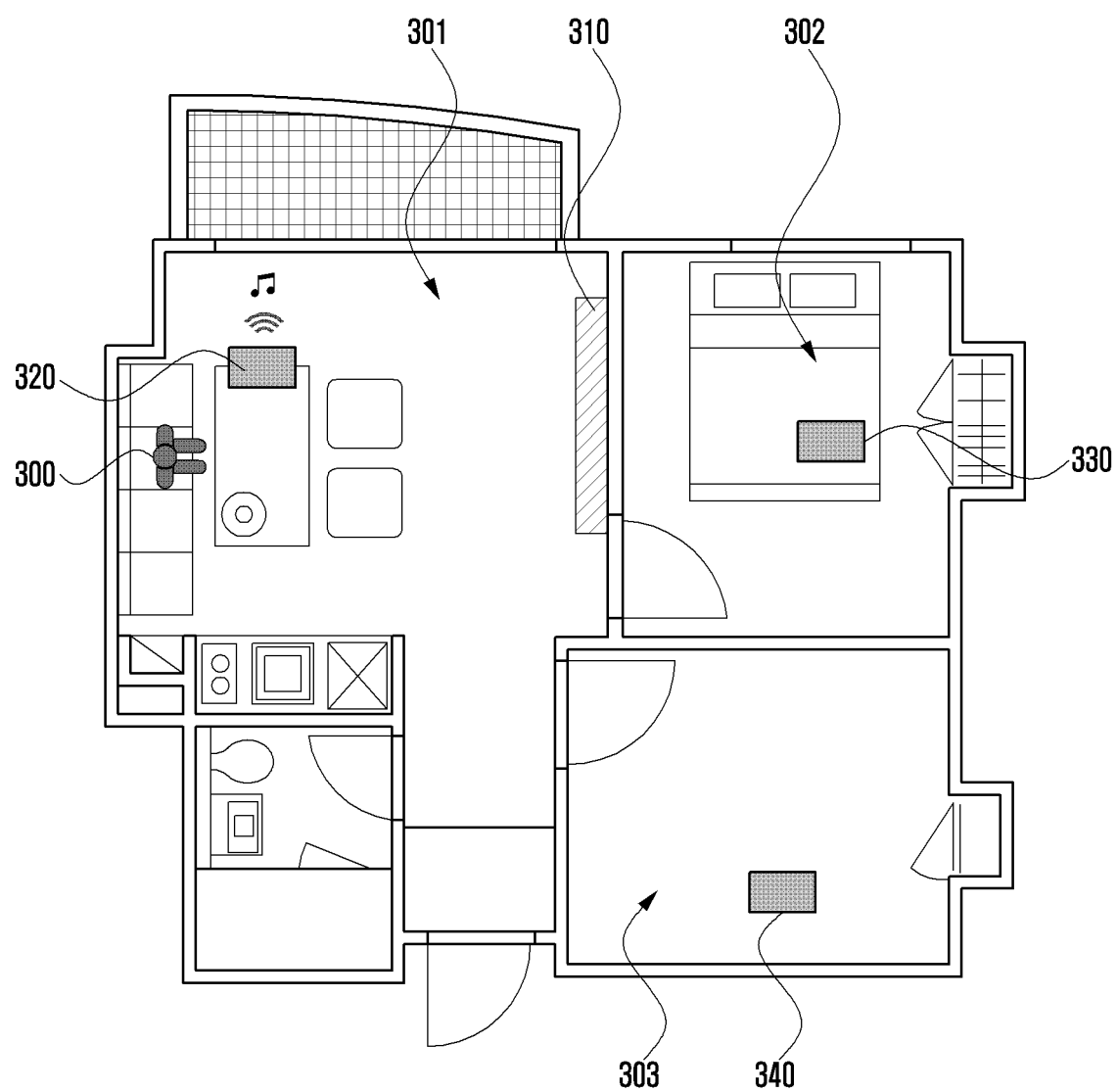
FIG. 3A is a diagram illustrating an example network environment for providing payment according to various embodiments.

FIG. 3A is a diagram illustrating an example network environment for providing payment according to various embodiments.

In FIG. 3A, for convenience of description, a plan view (or the structure) of the interior of a house is illustrated as an example, and a predetermined space inside the house in which multiple electronic devices are placed at various places (or positions) is illustrated as an example. According to an embodiment, FIG. 3A illustrates an example in which: a first electronic device 310 (e.g., the electronic device 201, such as a TV, which is illustrated in FIG. 2 and does not have a payment function) and a second electronic device 320 (e.g., the electronic device 101, such as a smart phone, a wearable device, or a tablet PC, which is illustrated in FIG. 1 and has a payment function) are placed in a first space 301 (e.g., a living room); a third electronic device 330 (e.g., a smart phone, a wearable device, or a tablet PC) is placed in a second space 302 (e.g., room 1); a fourth electronic device 340 (e.g., a smart phone, a wearable device, or a tablet PC) is placed in a third space 303 (e.g., room 2); and a user 300 exists in the first space 301.

According to an embodiment, in FIG. 3A, each of the first electronic device 310, the second electronic device 320, the third electronic device 330, and the fourth electronic device 340 may be owned and used by one user. The first electronic device 310, the second electronic device 320, the third electronic device 330, and the fourth electronic device 340 may be owned and used by at least two different respective users. One electronic device (e.g., the first electronic device 310) among the various electronic devices may be commonly used by multiple users. According to an embodiment, in FIG. 3A, the first electronic device 310 may be illustrated as a device which does not have a payment function (e.g., the second electronic device 201 of FIG. 2), and the second electronic device 320, the third electronic device 330, and/or the fourth electronic device 340 may be illustrated as a device having a payment function (e.g., the electronic device 101 of FIG. 1).

FIG. 3A may illustrate a state in which: in an environment where the multiple electronic devices 310, 320, 330, and 340 are placed in a predetermined space, the first electronic device 310 provides (e.g., displays) a content (e.g., a home shopping broadcast content or a web shopping web content) which allows the user 300 to purchase a product (e.g., an article); and the user 300 desires to purchase a product while using (e.g., watching) the first electronic device 310 (e.g., a TV).

According to various embodiments, if the user 300 makes a payment request through an electronic device which does not have a payment function (e.g., the electronic device 201, such as a payment request device, which is illustrated in FIG. 2) as in an example of the first electronic device 310, a determination may be made of an electronic device (e.g., a target electronic device for payment or a payment electronic device) which can easily perform payment in place of the above-described electronic device among the multiple electronic devices 320, 330, and 340 having a payment function, and payment may be performed through the determined electronic device (e.g., the first electronic device 101 of FIG. 1).

According to an embodiment, each user (e.g., the user 300) may own multiple electronic devices (e.g., a smart phone and a tablet PC), and may register, in at least one electronic device owned by the user, a card (e.g., a mobile card, an electronic card, or an application card, hereinafter "electronic card") corresponding to a real card for payment (e.g., a credit card or a physical card), or card information related to the real card (e.g., card company information, a card name, a card number, an expiration date, authentication information (e.g., an authentication number and fingerprint information), or the like). According to an embodiment, the user 300 may execute a mobile payment application (or an electronic payment application) in an electronic device (e.g., the electronic device 101 of FIG. 1), and may perform payment by selecting an electronic card capable of performing payment, based on the executed application.

According to various embodiments, while using the first electronic device 310 which does not have a payment function (e.g., watching a home shopping program), for purchase of a particular product, the user 300 may select (or input) purchase of a product provided (or displayed) by the first electronic device 310. For example, the user 300 may, for example, and without limitation, request payment for a product by operating a remote control (not illustrated) wirelessly connected to the first electronic device 310, or by making a touch input through a payment button displayed by the first electronic device 310. According to an embodiment, the electronic device 101 (e.g., the second electronic 320, such as a smart phone or a tablet PC, which is illustrated in FIG. 3A) may be used to serve as a remote control configured to remotely control the first electronic device 310. For example, the electronic device 101 may include an application (or a function) which can control the first electronic device 310 as in the case of a remote control. As an example, the user 300 may select (or touch) purchase of a product, provided through the first electronic device 310, using the electronic device 101.

According to various embodiments, if the first electronic device 310 receives (or detects) an input for payment request from the user, the first electronic device 310 makes it possible to proceed with payment in place of the first electronic device 310 itself through one electronic device among the multiple neighboring electronic devices 320, 330, and 340 having a payment function (or capable of performing payment). According to an embodiment, in response to a payment request of the user, the first electronic device 310 may transmit, to a server (not illustrated), a signal (or a message) for requesting verification of at least one electronic device capable of performing payment (or having a payment function) (hereinafter, referred to as a "payment-capable device"). According to an embodiment, a signal (or a message) for requesting verification of a payment-capable device may include, for example, and without limitation: input information for a payment request of the user; and context information related to the first electronic device 310. According to an embodiment, context information may include, for example, and without limitation, at least one piece of information among: information on a product for which a payment is to be made (e.g., a product code, a product type, a product quantity, and a product dealer); information on a payment amount; information on a user account registered in the first electronic device 310; information on a place (or a position) at which the first electronic device 310 is located in a space; and the like.

According to various embodiments, a server may configure a candidate group of payment electronic devices for payment among the multiple electronic devices 320, 330, and 340, or may indicate a device which can select (or determine) a payment electronic device among the multiple electronic devices. According to an embodiment, the server may identify electronic devices capable of performing payment (or having a payment function) among the multiple electronic devices 320, 330, and 340, may generate a list of the identified electronic devices, and may deliver the generated list to the first electronic device 310. According to an embodiment, the server may select a payment electronic device from a candidate group of the identified payment electronic devices, and may deliver information on the selected electronic device to the first electronic device 310.

In various example embodiments, the server may include a device, such as, for example, and without limitation, central control equipment, a hub, an artificial intelligent (AI) device (e.g., an AI speaker), a cloud server (or an account server), or the like, which can perform a role (or a function) of collecting information related to payment (e.g., whether payment can be performed, card information, and user account information) from multiple neighboring electronic devices to generate a candidate group of payment electronic devices or determine a payment electronic device. According to an embodiment, the server may include an internal server placed in the same space in which the electronic devices 310, 320, 330, 340 (which may be referred to hereinafter as electronic devices 310 to 340) are placed, or an external server placed outside the space in which the electronic devices 310 to 340 are placed. According to an embodiment, the internal server may use, for example, separate central control equipment or one electronic device, as a central server. According to an embodiment, the external server is a server existing at any location of the outside (e.g., over the internet), and may include, for example, and without limitation, a cloud server, an account server, a service server, a web server, or the like. In various embodiments, one electronic device among the electronic devices 310 to 340 in the same space may be implemented to serve as a server, an electronic device (e.g., the first electronic device 310), which detects a payment request of the user among the various electronic devices, may be implemented to serve as the server, or a separate server may be implemented to serve as the server.

According to various embodiments, among multiple electronic devices capable of performing payment, the server may determine a priority of a payment electronic device based on various conditions (e.g., positions of the electronic devices, states thereof, a discount rate of a registered card, or the like), may generate a list including at least one payment electronic device, based on the priority, and may provide the generated list to the first electronic device 310.

According to various embodiments, the first electronic device 310 may receive the list from the server, and may display the received list on the display. According to an embodiment, if the user selects (or designates) a payment electronic device from the list displayed on the display, the first electronic device 310 may transmit, to the server, a signal (or a message) for requesting execution of payment by the selected electronic device.

According to various embodiments, in response to reception of the signal for requesting payment from the first electronic device 310, the server allows the corresponding payment electronic device to proceed with (execute) the payment. For example, the server may transmit, to the payment electronic device, various pieces of information (e.g., product information, a payment amount, and mutual information) related to payment for a product, and a signal including a command for controlling execution of payment.

In various embodiments, one electronic device (e.g., the first electronic device 310 receiving a payment request from the user, or an external electronic device (or the other electronic device 320, 330, and 340)) among the electronic devices 310 to 340 in the same space may be implemented to serve as a server.

According to an embodiment, in an example where a payment electronic device is the third electronic device 330 placed in the second space 302, in response to reception of a command for controlling execution of payment from the server, the third electronic device 330 may execute an electronic payment application (or a mobile payment application, hereinafter "payment application"), and may perform a payment procedure based on the executed payment application. According to an embodiment, the user 300 may perform payment by selecting an electronic card capable of performing payment, based on the payment application executed by the third electronic device 330.

According to various embodiments, an operation of determining a payment electronic device among multiple electronic devices to perform payment will be described in greater detail below with reference to the following drawings.

Figure 3B:
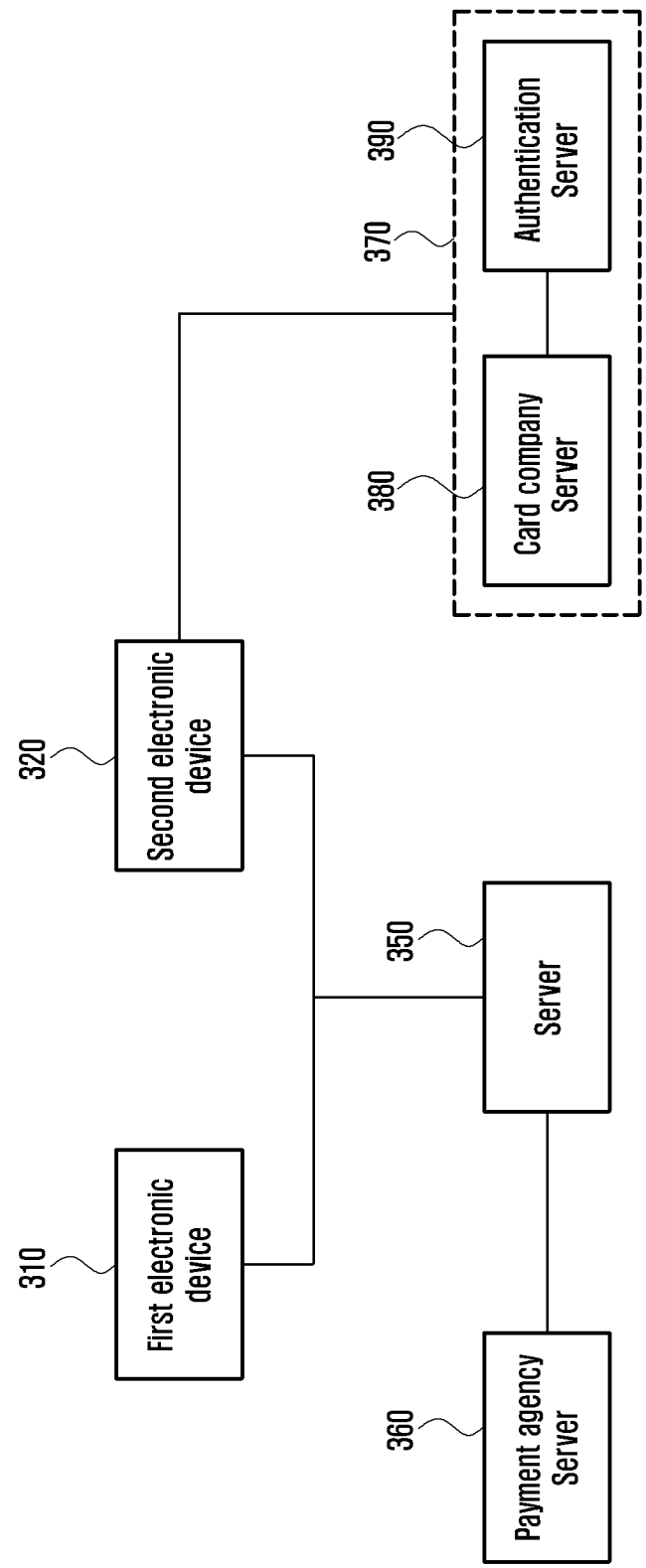
FIG. 3B is a block illustrating an example configuration of a system for supporting payment by an electronic device according to various embodiments.

FIG. 3B is a block diagram illustrating an example configuration of a system for supporting payment by an electronic device according to various embodiments.

Referring to FIG. 3B, in various example embodiments, the system for supporting payment by an electronic device may include, for example, a first electronic device 310, a second electronic device 320, a server (e.g., a cloud server) 350, a payment agency server 360, a payment server 370 (e.g., including a card company server 380 and an authentication server 390), or the like.

According to an embodiment, in FIG. 3B, the first electronic device 310 may, for example, be illustrated as an electronic device which does not have a payment function (or in which a payment application is not installed, or in which information on a card with which payment can be made is not registered), for example, the electronic device 201 of FIG. 2 or the first electronic device 310 of FIG. 3A.

According to an embodiment, in FIG. 3B, examples of the second electronic device 320 may include, for example, and without limitation, a smart phone, a wearable device, a tablet PC, and the like, which can execute an electronic payment application (e.g., a Samsung Pay™ application). According to an embodiment, the second electronic device 320 may refer, for example to all various types of devices (e.g., the electronic device 101 of FIG. 1) having a payment function (or capable of performing payment, or capable of executing a payment application). According to an embodiment, the second electronic device 320 may include information on a card company and/or information on a financial company, which has issued a physical card and an electronic card (or an application card, etc.). According to an embodiment, the second electronic device 320 may be functionally connected to the server 350 through an application installed thereon. For example, the second electronic device 320 may transmit or receive payment-related information to/from the server 350 through the executed payment application. According to an embodiment, the server 350 may transmit or receive payment-related information to/from the payment agency server 360 which is functionally connected to the server 350.

In various embodiments, the first electronic device 310 and the second electronic device 320 may be devices managed by an account of the user.

According to an embodiment, a payment application executed by the second electronic device 320 may provide a user interface (UI) and a user experience (UX) corresponding to electronic payment. For example, the user may register one or more electronic cards through the payment application, and the second electronic device 320 may provide information on the registered card and/or various user interfaces related to proceeding with payment using the card.

According to an embodiment, the server 350 may determine a payment-capable device capable of performing payment among multiple electronic devices, and may provide the first electronic device 310, which has made a payment request, with information on the determined payment-capable device, or a list including the information on the determined payment-capable device. According to an embodiment, if one electronic device (e.g., a payment electronic device selected from among the payment-capable devices) is selected by the first electronic device 310, the server 350 may determine the selected payment-capable device as a payment electronic device (e.g., the second electronic device 320), and may control the relevant payment electronic device (e.g., the second electronic device 320) to proceed with a process related to payment. In various embodiments, the server 350 may refer, for example, to a device, such as, for example, and without limitation, central control equipment, a hub, an artificial intelligent device, a cloud server, or the like, which can be connected to neighboring electronic devices and can communicate with and control the connected neighboring electronic devices.

In various embodiments, the server 350 may store a unique identifier of the second electronic device 320 and information on an account of the user, and may pre-register and manage card information (e.g., a card name, a card number, an expiration date, and card use information) corresponding to at least one card used by the user (or registered in the second electronic device 320). According to various embodiments, the server 350 may store and manage information on other accounts associated with the user (e.g., a family account and a group account), and may store and manage related payment data. According to an embodiment, the server 350 may relay card information for payment between the second electronic device 320 and the payment agency server 360. According to an embodiment, the server 350 may communicate with the payment agency server 360 through a wireless communication channel, and may communicate with the first electronic device 310 and the second electronic device 320 through a direct (e.g., wired) communication channel or a wireless communication channel.

According to an embodiment, the payment agency server 360 may, for example, be a device configured to perform payment in place of (or on behalf of) the second electronic device 320 at least based on payment information on the second electronic device 320, which has been received from the server 350. According to an embodiment, if the payment agency server 360 performs payment in place of the second electronic device 320, the payment agency server 360 may interwork with the server 350, and thus may transmit or receive an authentication request and an authentication response related to the second electronic device 320 to/from the server 350, or may transmit and/or receive payment related information thereto/from.

According to an embodiment, the external server 370 may include, for example, the card company server 380 and the authentication server 390 (e.g., a fast identity online (FIDO) server).

According to an embodiment, the card company server 380 may, for example, be a server which is actually operated by a card company, and may store and manage individual card information of each user. According to an embodiment, the card company server 380 may issue a card to a user (or the second electronic device 320), and may manage the issued card. According to an embodiment, the card company server 380 may be connected to another server (e.g., a financial server (not illustrated), a purchase server (not illustrated), or a token server) in a wired or wireless manner. According to an embodiment, the card company server 380 may issue (e.g., one-time issuance or issuance at the time of registering a card) and manage a token used for an electronic payment service. In an embodiment, a token may replace unique card information (a primary account number (PAN)). In an embodiment, a token may be generated using bank identification information (a bank identification number (BIN)). According to an embodiment, a token server (not illustrated) may transmit a token for authentication related to payment by the user (or the second electronic device 320), to the card company server 380 and/or the payment agency server 360.

According to an embodiment, the authentication server 390 may, for example, be a server related to authentication for user verification. According to an embodiment, if the authentication server 390 proceeds with payment in relation to the second electronic device 320, the authentication server 390 may process user authentication based on biometric information (e.g., registered fingerprint information, registered iris information, etc.) (or based on biometric authentication). According to an embodiment, the authentication server 390 may perform user verification based at least on at least one authentication scheme among, for example, and without limitation, a pin-based authentication scheme, an online authentication-based (e.g., a scheme, such as communication company authentication) scheme, an online biometric authentication (e.g., fast identity online (FIDO))-based scheme, or the like. According to an embodiment, the authentication server 390 may transmit a result of the authentication related to the payment by the user (or the second electronic device 320), to the card company server 380 and/or the payment agency server 360. According to an embodiment, the authentication server 390 may be connected to a financial server (not illustrated) or a purchase server (not illustrated) in a wired or wireless manner. According to various embodiments, the card company server 380 and the authentication server 390 may be implemented as one integrated server 370 or may be implemented separately.

As described above, a system (e.g., the electronic device 101 of FIG. 1, the server 350 of FIG. 3B, and the server 420 of FIG. 4) according to various example embodiments may include at least one electronic device and at least one server, each comprising: a communication interface comprising communication circuitry (e.g., the communication module 190 of FIG. 1); at least one processor (e.g., the processor 120 of FIG. 1) operatively connected to the communication interface; and at least one memory (e.g., the memory 130 of FIG. 1) electrically connected to the processor 120, wherein the memory 130 is configured to store instructions that, when executed by the processor 120 control an electronic device or server to: receive a first signal including information on a payment request of a user and context information related to a first electronic device (e.g., the electronic device 201 of FIG. 2 or the first electronic device 310 or 410 of FIG. 4), which does not have a payment function, from the first electronic device through the communication interface; identify at least one second electronic device (e.g., the electronic device 101 of FIG. 1 or the second electronic device 430 of FIG. 3A or FIG. 4) having a payment function and related to an account of the user in response to receiving the first signal; transmit a second signal including information on the at least one second electronic device to the first electronic device 410 through the communication interface; receive a third signal for selection of one of the at least one second electronic device through the communication interface; and transmit a fourth signal including information related to payment to the selected second electronic device (e.g., the second electronic device 430 of FIG. 4), based at least in part on the third signal.

According to various example embodiments, the instructions may, when executed by the processor 120, control the electronic device or server to, based on the at least one second electronic device being identified, identify at least one second electronic device having a payment function and related to the account of the user among multiple neighboring electronic devices based at least in part on context information related to the first electronic device.

According to various example embodiments, the instructions may, when executed by the processor 120, control the electronic device or server to, based on the at least one second electronic device being identified, identify at least one second electronic device having a payment function among multiple neighboring electronic devices, based at least in part on context information related to the at least one second electronic device.

According to various example embodiments, the context information related to the at least one second electronic device may include at least one piece of information among: information on a device position of the at least one second electronic device; information on a device state thereof; and card information on a registered card.

According to various example embodiments, the context information related to the first electronic device may include: information on a device position of the first electronic device; and information on an account of the user registered in the first electronic device.

According to various example embodiments, the instructions may, when executed by the processor 120, control the electronic device or server to: based on the first signal being received from the first electronic device, transmit at least one request related to determination of a payment-capable device, to the at least one second electronic device; and receive a response corresponding to the request.

According to various example embodiments, the instructions may, when executed by the processor 120, control the electronic device or server to identify the at least one second electronic device based on whether a response corresponding to the request has been received.

According to various example embodiments, the instructions may, when executed by the processor 120, control the electronic device or server to determine a priority for the at least one second electronic device based at least in part on a response corresponding to the request.

According to various example embodiments, the instructions may, when executed by the processor 120, control the electronic device or server to generate a list including information on payment-capable devices based on the determined priority.

According to various example embodiments, the third signal may include: information on a final payment electronic device selected by the user through the first electronic device, among the at least one second electronic device; and information related to payment by the final payment electronic device.

As described above, an electronic device 201 (e.g., the electronic device 201 of FIG. 2 or the first electronic device 410 of FIG. 4) according to various example embodiments may include: a communication interface (e.g., the communication interface 230 of FIG. 2) comprising communication circuitry; a display (e.g., the display 240 of FIG. 2); at least one processor (e.g., the processor 210 of FIG. 2) operatively connected to the display and the communication interface; and at least one memory (e.g., the memory 220 of FIG. 2) electrically connected to the processor 210, wherein the memory 220 is configured to store instructions that, when executed by the processor 210, control the electronic device to: display, on the display, a content and a user interface configured to receive a payment request related to the content; receive a first input related to the payment request through the user interface; transmit information related to the first input to an external server through the communication interface; receive, from the external server, a list of at least one external electronic device having a payment function and related to an account of a user; display the list on the display; receive a second input for selection of one external electronic device among the at least one external electronic device of the list; and transmit information on the second input to the external server through the communication interface.

According to various example embodiments, the instructions may, when executed by the processor 210, control the electronic device to, based on the information on the second input being transmitted to the external server, transmit the information on the second input including information on the external electronic device selected based on the second input among the at least one external electronic device, and information related to payment by the external electronic device.

According to various example embodiments, the instructions may, when executed by the processor 210, control the electronic device to, based on the list being displayed, display the list based on a priority related to the at least one external electronic device.

According to various example embodiments, the instructions may, when executed by the processor 210, control the electronic device to, based on the information related to the first input being transmitted, transmit the information related to the first input including information on the payment request and context information related to the electronic device.

Figure 4:
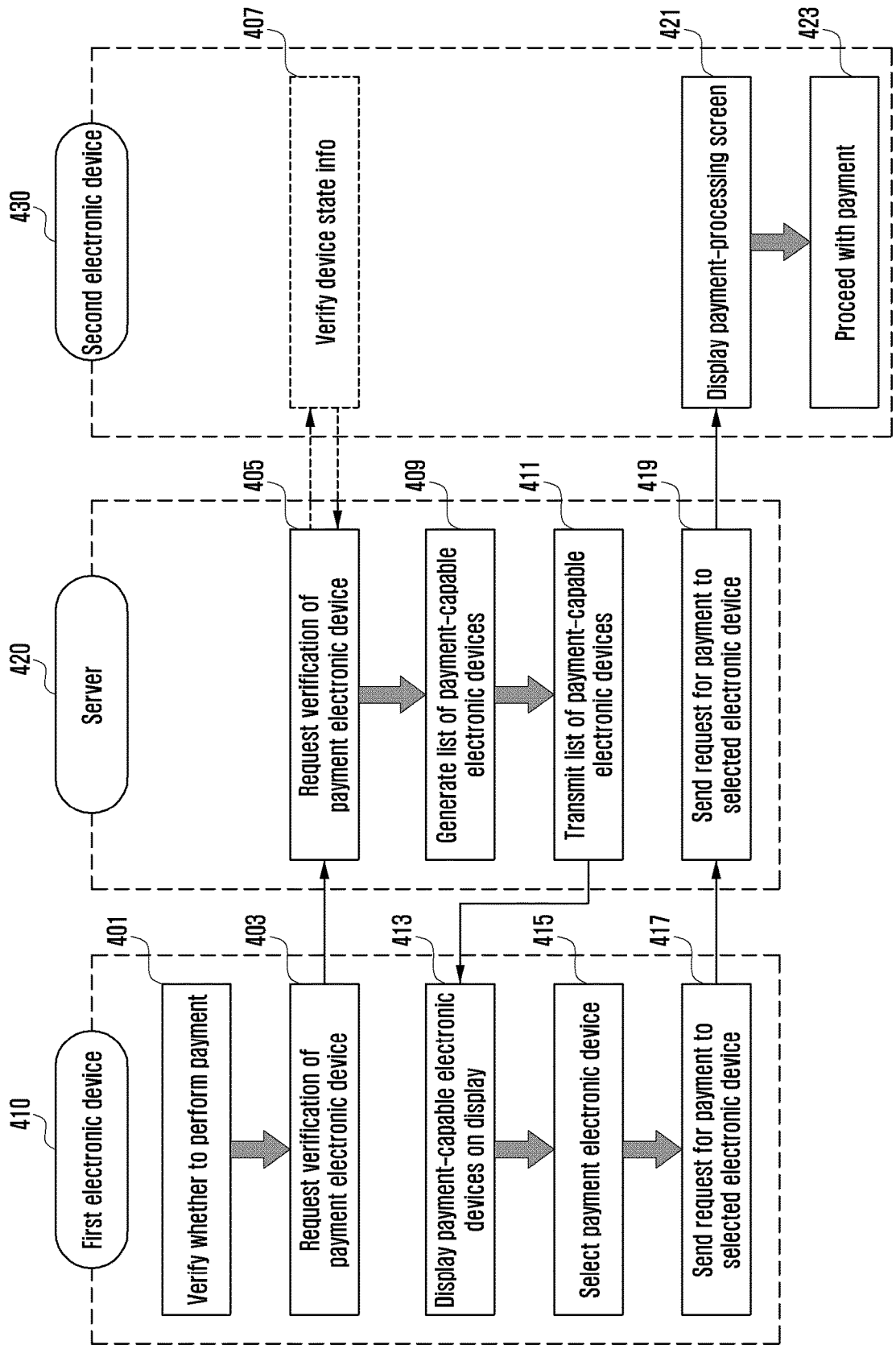
FIG. 4 is a signal flow diagram illustrating an example operation of processing payment based on interworking between electronic devices according to various embodiments.

FIG. 4 is a signal flow diagram illustrating an example operation of processing payment based on interworking between electronic devices according to various embodiments.

FIG. 4 may illustrate an example configuration in which a user is watching (or using) a content related to sale of products (e.g., home shopping or Internet shopping) using a first electronic device 410 (e.g., the electronic device 210, such as a TV, which is illustrated in FIG. 2). According to an embodiment, in FIG. 4, the first electronic device 410 may be an example of an electronic device (e.g., a TV) which does not have a payment function, for example, a payment application, (or which is incapable of performing payment). According to an embodiment, FIG. 4 illustrates an example in which, among multiple electronic devices having a payment function (or capable of performing payment), the second electronic device 430 (e.g., the electronic device 101 of FIG. 1) is determined as a payment electronic device for payment for a product, and thus the second electronic device 430 proceeds with payment.

Referring to FIG. 4, in operation 401, the first electronic device 410 may verify whether to perform payment. According to an embodiment, a user who uses a content related to purchase of a product using the first electronic device 410 may request the first electronic device 410 for payment for a product in order to purchase the relevant product. For example, a payment request of the user may be made, for example, and without limitation, by: manipulating and selecting a payment button displayed on the first electronic device 410 through an external electronic device (e.g., a remote control or an electronic device connected to the first electronic device 410 according to a particular scheme and operating as a remote control device); selecting a physical/software payment button disposed on an external electronic device; directly touching a payment button displayed on the first electronic device 410, or the like. According to an embodiment, the first electronic device 410 may detect a payment request in response to a user input for selection of a predetermined payment button as in the above-described example. According to an embodiment, if the first electronic device 410 is connected to an artificial intelligence (AI) service, the user may input a voice command (e.g., "Purchase a product currently being reproduced (or currently being displayed)"), and the first electronic device 410 may detect a payment request through voice recognition of the voice command of the user.

In operation 403, if the first electronic device 410 detects an input, made, for example, by the user, for requesting payment related to a product in the content, the first electronic device 410 may transmit, to the server 420, a request for verification of an electronic device capable of performing payment (hereinafter, referred to as a "payment-capable device"). According to an embodiment, in order to proceed with payment, the first electronic device 410 may transmit information on at least one user account through which the user is currently logging in to the first electronic device 410 (or at least one user account pre-registered in the first electronic device 410), together with a payment request.

In operation 405, if the server 420 receives a request for verification of a payment-capable device from the first electronic device 410, the server 420 may verify a payment-capable device based on the received information on the user account. According to an embodiment, information used by the server 420 to verify a payment-capable device may include, for example, and without limitation: information on an electronic device capable of performing payment (or having a payment function) registered in the user account; information on a registered card; information on a current state of the electronic device (e.g., which is a current state of a device, and whether the device is powered on or powered off, or whether the device is currently used); information on a current position of the electronic device (e.g., a current device position); and the like. According to an embodiment, in operation 407, the server 420 may verify device state information of the second electronic device 430 based on a device state request and a device state response in relation to the second electronic device 430. According to an embodiment, in order to determine a current device state, the server 420 may send a request for a device state, to a payment-capable device (e.g., the second electronic device 430) determined (or identified) based on the user account of the user of the first electronic device 410, and may receive a response corresponding to the request. According to various embodiments, the server 420 may extend a payment-capable device to be verified even to a payment-capable device registered in another account (e.g., a family account or a group account) associated with the user account of the user of the first electronic device 410. According to another embodiment, if necessary, the server 420 may send a request for information for verification of a device state, to other neighboring payment-capable devices, and may receive a response corresponding to the request.

In operation 409, the server 420 may generate a list of electronic devices capable of performing payment. According to an embodiment, the server 420 may verify at least one electronic device capable of performing payment, at least based on information for verification of a payment-capable device, and may generate a list of the verified electronic devices (e.g., payment-capable devices). According to an embodiment, the list may be generated to have information on a priority of a payment-capable device and/or card information, or an order according to a priority. According to an embodiment, if one payment-capable device exists, the list may notify the first electronic device 410 that the relevant electronic device can perform payment, and the relevant payment-capable device may immediately generate notification to allow the user to immediately proceed with payment.

In operation 411, the server 420 may transmit the generated list to the first electronic device 410.

In operation 413, if the first electronic device 410 receives the list from the server 420, the first electronic device 410 may display the list on the display so that the user can verify payment-capable devices. According to an embodiment, if the list is displayed, the first electronic device 410 may display a payment-capable device and/or card information according to a configured priority.

In operation 415, in response to an input for selection (or designation) of one payment-capable device (e.g., a target electronic device for payment) by the user, the first electronic device 410 may select (or determine) a final electronic device (e.g., a payment electronic device) which is to perform payment in place of the first electronic device 410. According to an embodiment, the user may select one of payment-capable devices provided in the list. For example, the list displayed through the first electronic device 410 may include information on a payment-capable device. As an example, information on a payment-capable device, such as, for example, and without limitation: what type of electronic device the payment-capable device is (or who the payment-capable device is owned by); where the payment-capable device is located; which card is registered in the payment-capable device; what discount rate is applied to a card, or the like, may be displayed in the list. According to an embodiment, the user may determine a payment electronic device which is to perform payment, based on the information on the payment-capable device of the list, and the user may select the determined payment electronic device using the first electronic device 410 or a remote control connected to the first electronic device 410. According to an embodiment, if the list is provided based on card information, the user may also select a payment electronic device in a unit of card.

In operation 417, the first electronic device 410 may request the server 420 for payment, based on information of the selected electronic device. According to an embodiment, the first electronic device 410 may transmit, to the server 420, information corresponding to the payment electronic device according to the user's selection, or information of the card according to the user's selection, and may request payment by an electronic device matching the corresponding information.

In operation 419, if the server 420 receives information on the payment electronic device from the first electronic device 410, the server 420 may determine an electronic device corresponding to the received information (e.g., the second electronic device 430) as a payment electronic device, and may request the determined electronic device (e.g., the second electronic device 430) to proceed with payment.

In operation 421, in response to reception of a payment request from the server 420, the second electronic device 430 may display a payment-processing screen on a display thereof. According to an embodiment, the second electronic device 430 may execute a mobile payment application (or an electronic payment application), and may display a screen related to payment processing (or a user interface) based on the executed mobile payment application.

In operation 423, the second electronic device 430 may proceed with a payment procedure in response to the user's input (or operation) on the screen related to payment processing. According to an embodiment, the second electronic device 430 may proceed with a payment procedure related to payment, including, for example, and without limitation: display of a payment screen for a product selected by the first electronic device 410; display of various pieces of information which are input in relation to payment by the user on the payment screen; execution of authentication related to payment based on the various pieces of input information; and the like.

According to various embodiments, the server 420 may provide the list to the first electronic device 410, and simultaneously, may transmit, in advance, a payment request to all payment-capable devices capable of performing payment which are included in the list. In this example, the user may verify which electronic device is to be used to perform payment in the list, and may immediately proceed with a prepared payment-processing procedure only through user authentication (e.g., fingerprint authentication or iris authentication) using the corresponding electronic device.

Figure 5:
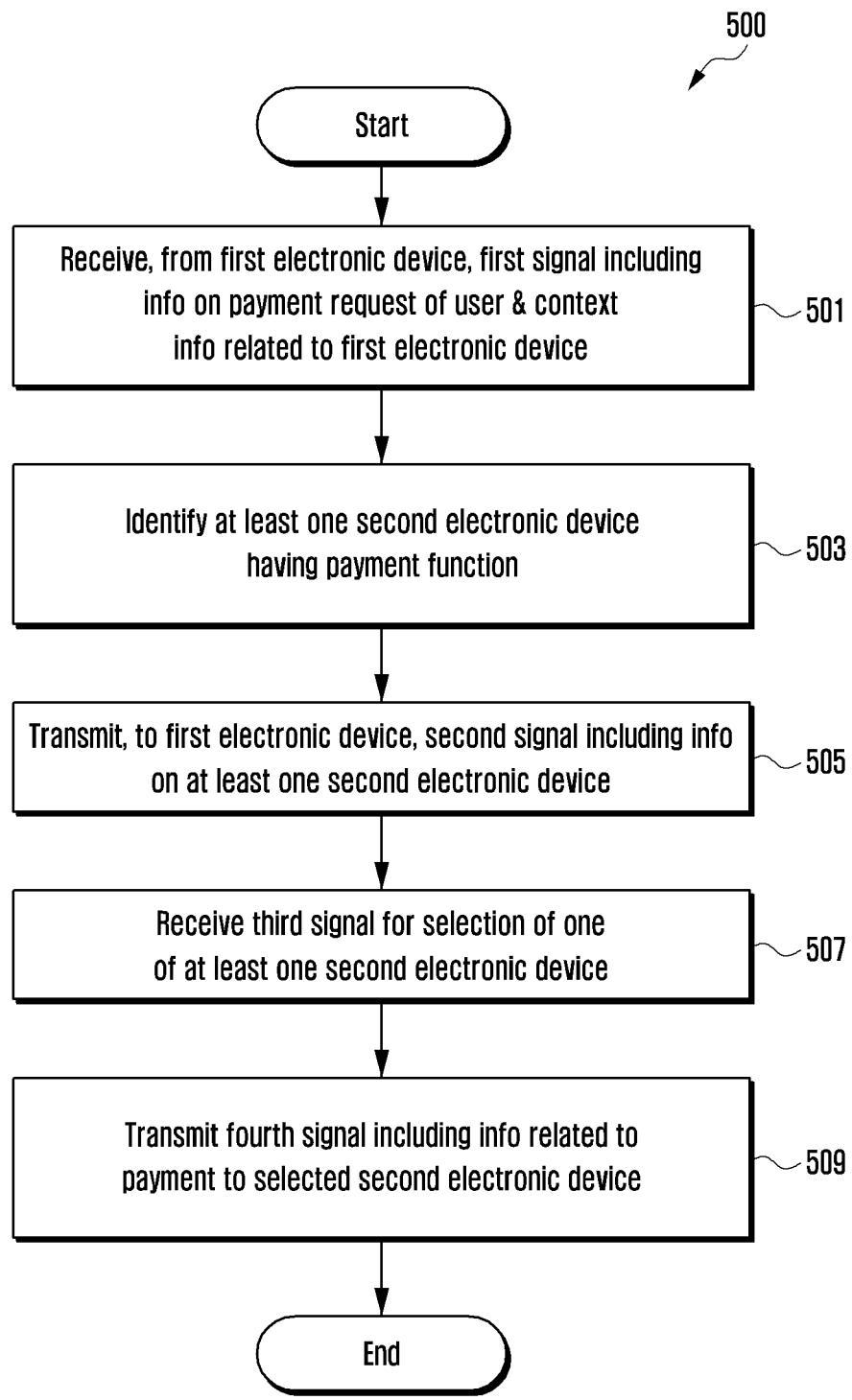
FIG. 5 is a flowchart illustrating an example method of operating an electronic device according to various embodiments.

FIG. 5 is a flowchart 500 illustrating an example method of operating an electronic device according to various embodiments.

According to an embodiment, FIG. 5 illustrates an example in which the electronic device 101 operates as a device (e.g., a server or a system) configured to: receive a payment request from an external electronic device; and select a payment electronic device to provide related information to the external electronic device, in response to the payment request.

Referring to FIG. 5, in operation 501, the processor 120 (e.g., at least one processor including a processing circuit, and/or instructions that cause the processor 120 to operate if a memory (e.g., the memory 130 of FIG. 1) is executed) of the electronic device 101 may control the electronic device to receive, from a first electronic device, a first signal including information on a payment request of a user (e.g., the user 300 of FIG. 3A) and context information related to the first electronic device (hereinafter, referred to as "first context information"). According to an embodiment, the first electronic device may be an electronic device which does not have a payment function (e.g., the electronic device 201 of FIG. 2 or the first electronic device 310 or 410 of FIG. 3A or FIG. 4). According to an embodiment, through a communication interface (e.g., the communication module 190 of FIG. 1), the processor 120 may control the electronic device to receive, from the first electronic device, a first signal including, for example, and without limitation: an input (e.g., a first input) for requesting verification of a payment electronic device for payment related to a content displayed on a display of the first electronic device, which does not have a payment function; and first context information related to the first electronic device. According to an embodiment, the first context information related to the first electronic device may include at least one piece of information among, for example, and without limitation: information on a product for which a payment is to be made; information on a payment amount; information on a user account registered in the first electronic device; information on a place (or a position) at which the first electronic device is located in a space; and the like. According to an embodiment, the communication interface may be disposed inside a housing of the electronic device 101, and may be configured to be electrically connected to an antenna of the electronic device 101 to support a communication protocol.

In operation 503, the processor 120 may control the electronic device to identify at least one second electronic device (e.g., a payment electronic device) having a payment function. According to an embodiment, if a first signal is received, the processor 120 may recognize that the first electronic device has requested verification of a payment electronic device, based on a first input of the first signal, and may identify at least one second electronic device based on first context information. According to an embodiment, if a first signal is received from the first electronic device, the processor 120 may control the electronic device to verify a user account based on the first context information related to the first electronic device, and may identify at least one second electronic device which, among multiple neighboring electronic devices, is related to the user account and has a payment function. According to an embodiment, if the at least one second electronic device is identified, the processor 120 may control the electronic device to identify at least one second electronic device having a payment function among multiple neighboring electronic devices, based at least in part on context information related to the at least one second electronic device (hereinafter, referred to as "second context information"). According to an embodiment, the second context information related to the at least one second electronic device may include at least one piece of information among, for example, and without limitation, device state information, device position information, registered card information, or the like.

In operation 505, the processor 120 may control the electronic device to transmit, to the first electronic device, a second signal including information on the at least one second electronic device (e.g., information on a payment electronic device). According to an embodiment, the processor 120 may control the electronic device to generate a list including the information on the identified at least one second electronic device, and may transmit the generated list to the first electronic device. According to an embodiment, if one second electronic device has been identified, the processor 120 may control the electronic device to immediately transmit information on the relevant second electronic device to the first electronic device. According to an embodiment, if multiple second electronic devices have been identified, the processor 120 may generate a list based on pieces of information on the at least two second electronic devices, and may transmit the list to the first electronic device. According to an embodiment, if a list is generated, the processor 120 may control the electronic device generate the same such that the at least two second electronic devices are arranged (or placed) in an order according to priorities thereof. According to an embodiment, information on a payment electronic device may include, for example, and without limitation, at least one piece of information among, for example, identification information (e.g., a user's name, a device name, and a telephone number) of the relevant electronic device, card information registered in the relevant electronic device, discount information based on the card information, and point (or accumulation) information based on the card information.

In operation 507, the processor 120 may control the electronic device to receive, from the first electronic device, a third signal for selection of one of the at least one second electronic device. According to an embodiment, the processor 120 may control the electronic device to receive, through the communication interface, a third signal transmitted by the first electronic device in response to a user input for selection of one second electronic device (e.g., a final payment electronic device) from the at least one second electronic device by the user. According to an embodiment, a third signal may include, for example, and without limitation, information on a final payment electronic device for payment (e.g., a second electronic device selected by the user through the first electronic device), and information for requesting execution of payment by the selected second electronic device. According to an embodiment, a third signal may further include, for example, and without limitation, payment information related to payment. According to an embodiment, payment information related to payment may not be included in a third signal, but may be configured by the electronic device 101 (or the processor 120) based on at least a part of the previously-received first context information. For example, the processor 120 may control the electronic device to configure payment information including information (e.g., a product code, a product type, a product quantity, and a product dealer) on a product, for which a payment is to be made, and a payment amount, in first context information.

In operation 509, the processor 120 may control the electronic device to transmit a fourth signal including information related to payment, to the selected second electronic device based at least in part on the third signal. According to an embodiment, if a third signal including information on the selected second electronic device for payment is received from the first electronic device, the processor 120 may control the electronic device to transmit a fourth signal including information for requesting payment and payment information, to the second electronic device through the communication interface.

Figure 6:
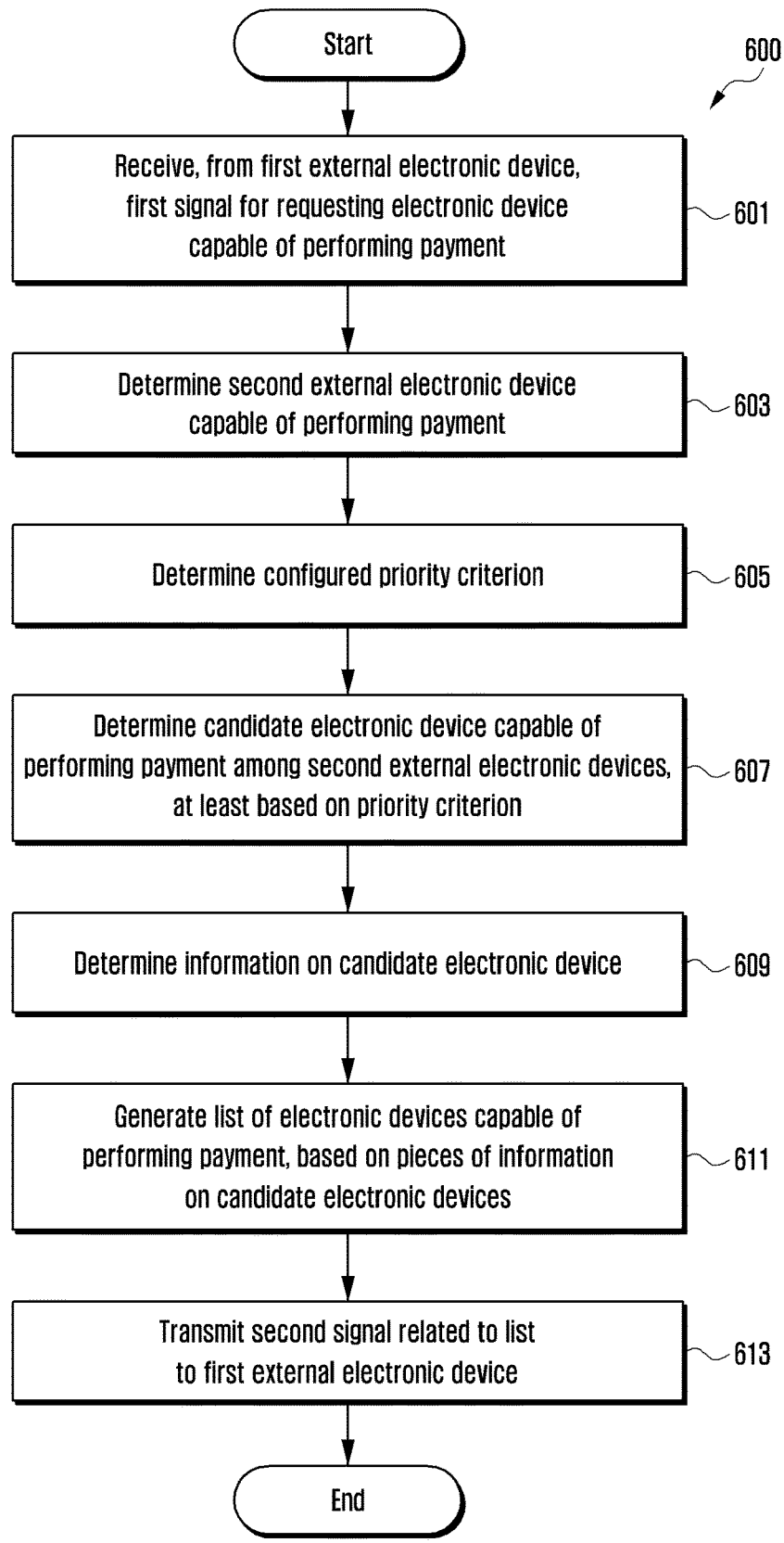
FIG. 6 is a flowchart illustrating an example method of operating an electronic device according to various embodiments.

FIG. 6 is a flowchart 600 illustrating an example method of operating an electronic device according to various embodiments.

According to an embodiment, FIG. 6 illustrates an example in which the electronic device 101 operates as a device (e.g., a server or a system) configured to: receive a payment request from an external electronic device; and select a payment electronic device in response to the payment request to provide related information to the external electronic device. According to an embodiment, FIG. 6 illustrates an example of an operation of the electronic device 101 for selecting a payment electronic device and generating a list.

Referring to FIG. 6, in operation 601, the processor 120 (e.g., at least one processor including a processing circuit, or instructions that cause the processor 120 to operate if a memory (e.g., the memory 130 of FIG. 1) is executed) of the electronic device 101 may control the electronic device to receive, from a first external electronic device, a first signal for requesting an electronic device capable of performing payment. According to an embodiment, the first external electronic device may refer to an electronic device which does not have a payment function (e.g., the electronic device 201 of FIG. 2 or the first electronic device 310 or 410 of FIG. 3A or FIG. 4). According to an embodiment, through a communication interface (e.g., the communication module 190 of FIG. 1), the processor 120 may control the electronic device to receive, from the first external electronic device, a signal including, for example, and without limitation: an input for requesting verification of a payment electronic device for payment related to a content displayed on a display of the first external electronic device, which does not have a payment function; and context information related to the first external electronic device. According to an embodiment, the context information related to the first external electronic device may include, for example, and without limitation, at least one piece of information among: information on a product for which a payment is to be made; information on a payment amount; information on a user account registered in the first external electronic device; information on a place (or a position) at which the first external electronic device is located in a space; and the like.

In operation 603, the processor 120 may control the electronic device to determine a second external electronic device capable of performing payment. According to an embodiment, the processor 120 may control the electronic device to determine at least one second external electronic device having a payment function (e.g., the second electronic device 320, the third electronic device 330, and the fourth electronic 340 of FIG. 3A) among multiple neighboring electronic devices. According to an embodiment, the processor 120 may control the electronic device to determine an electronic device which is associated with a user account and can perform payment. According to an embodiment, the processor 120 may control the electronic device to verify an electronic device capable of performing payment at least based on, for example, and without limitation: information on an electronic device which can perform payment and is registered in a user account; information on a card registered therein; information on a current state of an external electronic device (e.g., whether the external electronic device is powered on or off, or whether the external electronic device is currently being used); information on a current position of the external electronic device; or the like.

In operation 605, the processor 120 may determine a configured priority criterion. According to an embodiment, a priority criterion may be configured as one or a combination of, for example, and without limitation, at least two of: a state of a device; card payment benefit (e.g., a discount rate and accumulated money); a position of the device; a user's preference (e.g., a card or an electronic device frequently used for payment); and the like.

In operation 607, the processor 120 may determine a candidate electronic device capable of performing payment among the second external electronic devices, based on the priority criterion. According to an embodiment, the processor 120 may control the electronic device to determine at least one second external electronic device satisfying the priority criteria, among the second external electronic devices, as a candidate group of payment electronic devices (or a candidate electronic device).

In operation 609, the processor 120 may control the electronic device to determine information on the candidate electronic device. According to an embodiment, information on a second external electronic device capable of performing payment may be pre-registered in the electronic device 101. According to an embodiment, information on a second external electronic device may be separately registered for each user account. According to an embodiment, information on a second external electronic device may not be pre-registered in the electronic device 101, and the electronic device 101 (or the processor 120) may collect (or acquire) information on a second external electronic device in an operation of determining the second external electronic device. For example, the processor 120 may control the electronic device to request a second external electronic device to provide information on the second external electronic device, and may acquire the information from the second external electronic device in response to the information provision request. According to an embodiment, the information on the candidate electronic device may include at least one piece of information among, for example, identification information (e.g., a user's name, a device name, and a telephone number) of the relevant electronic device, card information registered in the relevant electronic device, discount information based on the card information, and point (or accumulation) information based on the card information.

In operation 611, the processor 120 may control the electronic device to generate a list of electronic devices capable of performing payment, based on the pieces of information on the candidate electronic devices. According to an embodiment, if a list is generated, the processor 120 may include, in the list, the pieces of information on the candidate electronic devices, and may arrange (or place) the pieces of information on the candidate electronic devices in an order according to priorities thereof.

In operation 613, the processor 120 may control the electronic device to transmit a second signal related to the list to the first external electronic device.

Figure 7:
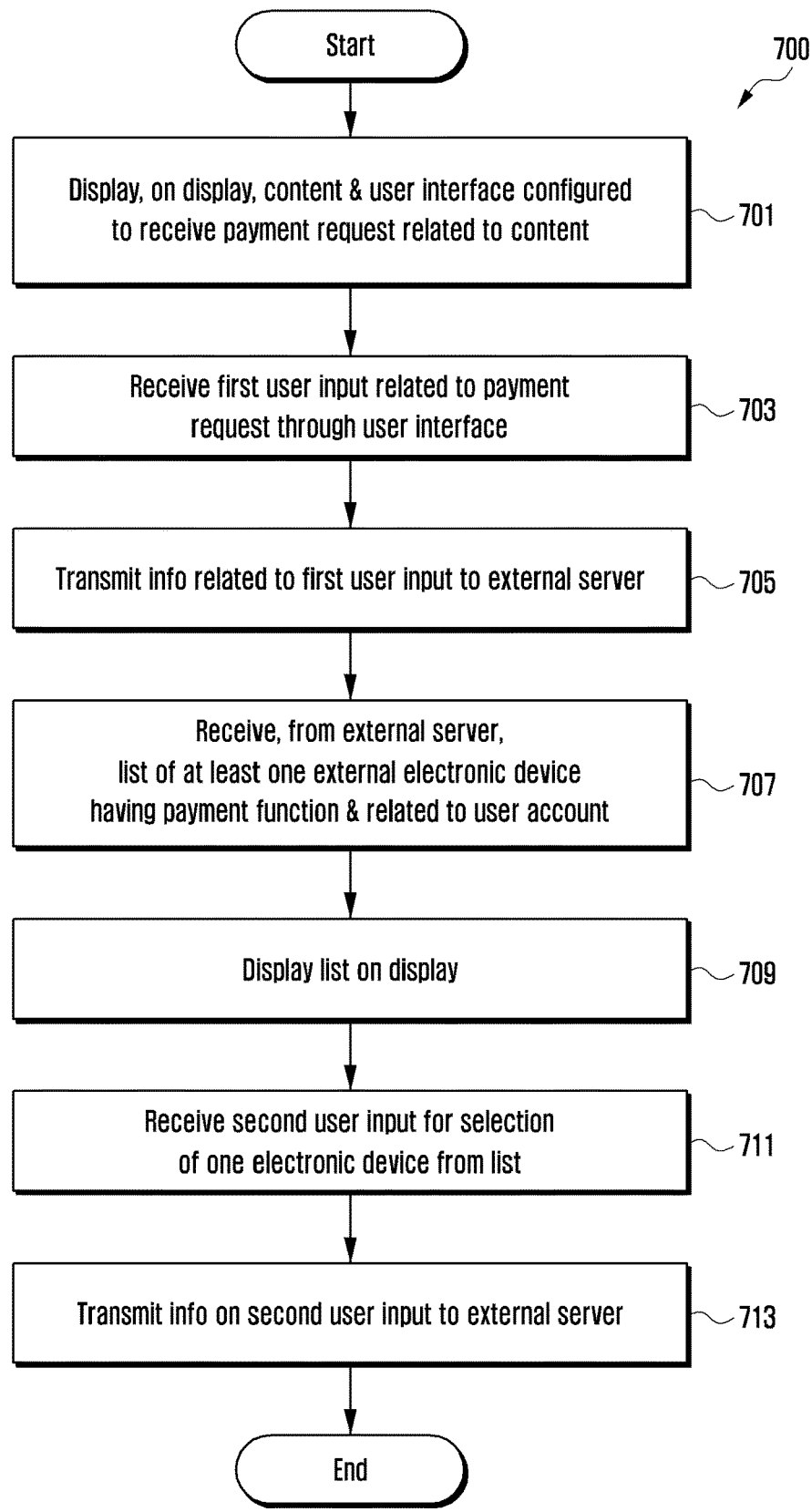
FIG. 7 is a flowchart illustrating an example method of operating an electronic device according to various embodiments.

FIG. 7 is a flowchart 700 illustrating an example method of operating an electronic device according to various embodiments.

According to an embodiment, FIG. 7 illustrates an example in which the electronic device 201 operates as a device (e.g., the electronic device 201 of FIG. 2 or the first electronic device 310 or 410 of FIG. 3A or FIG. 4) configured to: transmit a payment request to a first external electronic device (e.g., a server or a system); receive, from an external electronic device, information on at least one second external electronic device (e.g., a payment electronic device) capable of performing payment; and display the received information on a display (e.g., the display 240 of FIG. 2).

Referring to FIG. 7, in operation 701, the processor 210 (e.g., at least one processor including a processing circuit, or instructions that cause the processor 210 to operate if a memory (e.g., the memory 220 of FIG. 2) is executed) of the electronic device 201 may control the electronic device to display a content and a user interface configured to receive a payment request related to the content, on a display (e.g., the display 240 of FIG. 2). According to an embodiment, a user interface that the electronic device 201 displays on the display 240 will be described in greater detail below with reference to the drawings.

In operation 703, the processor 210 may control the electronic device to receive a first user input related to a payment request through a user interface. According to an embodiment, the first user input may include an input which allows a user (e.g., the user 300 of FIG. 3A) to select a payment button provided (or displayed) on the display 240 of the electronic device 201 through manipulation of an external electronic device (e.g., a remote control) connected to the electronic device 201. According to an embodiment, the first user input may include an input which allows the user (e.g., the user 300 of FIG. 3A) to directly select (e.g., touch) a payment button provided (or displayed) on the display 240 of the electronic device 201.

In operation 705, the processor 210 may control the electronic device to transmit information related to the first user input to an external server through a communication interface (e.g., the communication module 230 of FIG. 2). According to an embodiment, the information related to the first user input may include information on a payment request of the user and context information related to the electronic device 201. According to an embodiment, context information related to the electronic device 201 may include at least one piece of information among: information on a product for which a payment is to be made (e.g., a product code, a product type, a product quantity, and a product dealer); information on a payment amount; information on a user account registered in the electronic device 201; information on a place (or a position) at which the electronic device 201 is located in a space; and the like.

In operation 707, the processor 210 may control the electronic device to receive, from the external server, a list of at least one external electronic device having a payment function. According to an embodiment, the at least one external electronic device having a payment function may be an electronic device related to the user account. According to an embodiment, the external server may determine a user account at least partly based on the context information transmitted by the electronic device 201, and may transmit a list including external electronic devices which can perform payment and are related to the user account.

In operation 709, the processor 210 may control the electronic device to display the list on the display 240. According to an embodiment, the processor 210 may display the list, received from the external server, on at least a partial area (e.g., a partial area, or an edge area, of a screen) of the display 240, or an entire area of the screen. According to an embodiment, if the list is displayed, the processor 210 may control the electronic device to display information on at least one external electronic device arranged in an order according to a priority. According to an embodiment, the processor 210 may control the electronic device to display the list to overlap a content (or a user interface) that the electronic device 201 is displaying on the display 240, may display the list to be overlaid with the content (or a user interface) being displayed, or may display the list and the content on respective split screens.

In operation 711, the processor 210 may control the electronic device to receive a second user input for selection of one electronic device from the list. According to an embodiment, the second user input may include an input which allows the user (e.g., the user 300 of FIG. 3A) to select information on an external electronic device (or an item (or an object) including information) of the list through manipulation of an external electronic device (e.g., a remote control) connected to the electronic device 201. According to an embodiment, the second user input may include an input which allows the user (e.g., the user 300 of FIG. 3A) to directly select (e.g., touch) information on an external electronic device (or an item (or an object) including information) of the list provided (or displayed) on the display 240 of the electronic device 201.

In operation 713, the processor 210 may control the electronic device to transmit information on the second user input to the external server through the communication interface. According to an embodiment, the information on the second user input may include information on a final payment electronic device for payment (e.g., an external electronic device selected by the user), and information for requesting execution of payment by the selected external electronic device. According to an embodiment, the information on the second user input may further include payment information related to payment. According to an embodiment, the payment information related to payment may not be included in the information on the second user input, but may be configured at least partly based on context information related to the electronic device 201 by the external server. For example, the external server may configure payment information including information (e.g., a product code, a product type, a product quantity, and a product dealer) on a product, for which a payment is to be made, and a payment amount, in context information.

Figure 8:
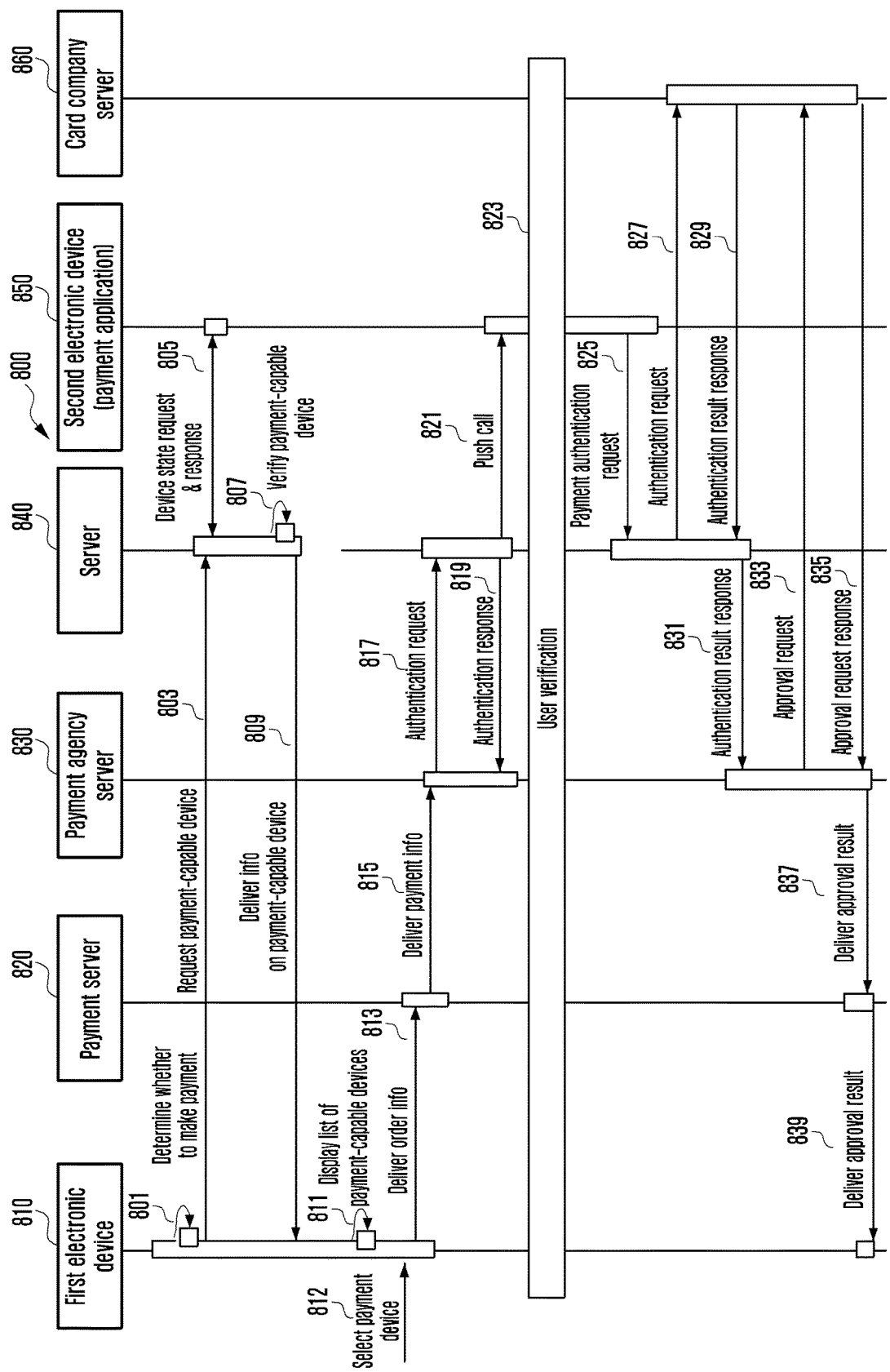
FIG. 8 is a system signal flow diagram illustrating an example operation for a payment service in a system according to various embodiments.

FIG. 8 is a system signal flow diagram 800 illustrating an example operation for a payment service in a system according to various embodiments.

According to an embodiment, FIG. 8 illustrates an example of an operating scenario of providing a payment service based on interworking between electronic devices.

As illustrated in FIG. 8, the system according to various embodiments may include a first electronic device 810, a payment server 820, a payment agency server 830, a server 840, a second electronic device 850, and a card company server 860. According to an embodiment, the first electronic device 810 may be a device which does not have a payment function (e.g., the electronic device 201 of FIG. 2), and the second electronic device 850 may refer, for example, to at least one device having a payment function (or capable of performing payment), for example, the electronic device 101 of FIG. 1. According to an embodiment, the server 840 may include an internal server placed in the same space in which the electronic devices 810 and 850 are placed, or an external server placed outside the space in which the electronic devices 810 and 850 are placed. For example, the server 840 may include a device, such as, for example, and without limitation, central control equipment, a hub, an AI device (e.g., an AI speaker), a cloud server (or an account server), or the like, which can perform a role (or a function) of collecting information related to payment (e.g., whether payment can be performed, card information, and user account information) from multiple electronic devices to generate a candidate group of payment electronic devices or determine a payment electronic device. According to an embodiment, one electronic device (e.g., a device configured to receive a payment request from a user, or the first electronic device 810) among the electronic devices 810 and 850 in the same space may be implemented to serve as the server 840.

Referring to FIG. 8, in operation 801, the first electronic device 810 may determine whether to make a payment. According to an embodiment, it may be assumed that the first electronic device 810 may, for example, be a TV and the user desires to purchase a particular product while watching a content related to sale of products (e.g., home shopping) through the first electronic device 810. According to an embodiment, while watching the content, the user may make an input on a payment screen provided on a display of the first electronic device 810, or may touch a payment button and the like assigned to a remote control, and thus may send, to the first electronic device 810, a request for payment for purchase of a product.

In operation 803, if the first electronic device 810 detects an input made by the user in order to request payment related to a product in a content currently being displayed (or reproduced), the first electronic device 810 may transmit, to the server 840, a request for verification of an electronic device capable of performing payment (hereinafter, referred to as a "payment-capable device"). According to an embodiment, the first electronic device 810 may deliver information (e.g., a user key, or a global unique identifier (GUID)) related to a user account via which the user is currently logged in to the first electronic device 810 (or a user account pre-stored in the first electronic device 810). Through this configuration, the server 840 may verify a payment-capable device and/or card information related to the user account. According to an embodiment, a GUID may be an identifier which can be solely used to identify a particular object (e.g., an electronic device). According to an embodiment, the server 840 may search for a payment-capable device which has a payment function and is related to a user account, based on the GUID. According to an embodiment, the server 840 may manage electronic devices for each user account. This configuration is shown as an example in Table 1 below.

TABLE 1

| Account | Device ID | GUID | Registered card | Group account |
|---|---|---|---|---|
| test1@samsung.com | 4578-5345 (first device) | 478921-247895 | Samsung card 5 | son1@sam.com wife@sung.com |
| | 4588-5775 (second | | Samsung card 7 | son1@sam.com wife@sung.com |

TABLE 1-continued

| Account | Device ID | GUID | Registered card | Group account |
|---|---|---|---|---|
| | device) | | AAA card 1<br>SSS card 2 | |
| son1@sam.com | 5523-7758<br>(third<br>device) | 789921-<br>222475 | AAA card 2 | test1@samsung.com<br>wife@sung.com |
| wife@sung.com | 7523-8781<br>(fourth<br>device) | 474121-<br>2778995 | BBB card 1 | son1@sam.com<br>test1@samsung.com |
| | 7323-8481<br>(fifth<br>device) | | SSS card 1<br>AAA card 1 | son1@sam.com<br>test1@samsung.com |
| ... | ... | ... | ... | ... |

In an embodiment, Table 1 may refer to an example of information managed by the server 840. As illustrated in Table 1, Table 1 shows an example of registering three accounts in the server 840. For example, the server 840 may store account information related to a first user account (e.g., test1@samsung.com), a second user account (e.g., son1@sam.com), and a third user account (e.g., wife@sung.com).

According to an embodiment, at least one payment-capable device having a payment function may be registered for each account. As an example, a first device and a second device may be registered in the first user account, a third device may be registered in the second user account, and a fourth device and a fifth device may be registered in the third user account. For example, at least one payment-capable device having a payment function may be managed based on a user account.

According to an embodiment, a user account-specific payment-capable device may be managed based on a device identifier (device ID) uniquely assigned to the corresponding payment-capable device, and a GUID may be assigned to each user account. In various embodiments, a GUID may represent information on a user key assigned per user account.

According to an embodiment, a registered card may include card information on a card registered in each payment-capable device. According to an embodiment, card information may include a separate sole numeral (or code), such as a device ID, and the like, and may further include a card type, a card name, or the like. According to an embodiment, the card information may further include information on card-specific discount rate and/or point accumulation, and the like, and these pieces of information may be acquired from the card company server 860 to be updated. According to an embodiment, a payment-capable device may have one or more pieces of card information registered therein.

According to an embodiment, the server 840 may store account information related to a group account (e.g., a family account). According to an embodiment, the server 840 may verify card information registered in payment-capable devices of an account related to a GUID and an account of a group member (e.g., another user), and thus may provide the payment-capable device and the card information which allow the user to perform payment.

In various embodiments, the information managed by the server 840 based on an account is not limited to the example of Table 1, and may further include various pieces of additional information, or some pieces of information may be omitted therefrom. For example, the information managed by the server 840 may include place information (or position information) of each device.

In operation 805, the server 840 may determine device states of electronic devices which can perform payment and is related to the user account, based on a request for a device state (e.g., whether a device is powered on or off, whether the device is currently being used, or a current position (or place) of the device) and a response thereto. According to an embodiment, in order to determine a current device state of a payment-capable device determined (or identified) based on a user account of the first electronic device 810, wherein the current device state may be, for example, whether the device is powered on or off, whether the device is currently being used, or a current position (or place) of the device, the server 840 may request the device state of the determined payment-capable device. According to an embodiment, the server 840 may periodically verify device states of electronic devices. For example, the electronic devices may provide the server 840 with pieces of information on device states at every configured cycle, and the server 840 may periodically acquire (or collect) device states of the electronic devices without a separate request operation.

In operation 807, the server 840 may verify a payment-capable device for payment (or a recommended electronic device). According to an embodiment, if the server 840 receives a response from each electronic device in response to a device state request, the server 840 may determine a relevant electronic device as a payment-capable device. According to an embodiment, if the server 840 receives a response from each electronic device in response to a device state request, the server 840 may also verify a payment-capable device based on a response result of the electronic device (e.g., device state information and/or device position information), from which a response has been received. According to an embodiment, if the server 840 does not receive a response from a relevant electronic device in response to a device state request (e.g., if there is no response from the relevant electronic device), the server 840 may exclude the relevant electronic device from payment-capable devices for recommendation to the user.

In operation 809, the server 840 may transmit information on the verified payment-capable device to the first electronic device 810. According to an embodiment, the server 840 may generate a list including information on at least one payment-capable device, and may transmit the generated list to the first electronic device 810. According to an embodiment, the server 840 may determine a priority for a payment-capable device and/or card information on a card. According to an embodiment, the server 840 may determine a priority at least based on: a place (or a position) at which a payment-capable device is currently located; a discount rate at the time of card payment; a card having a recent payment history; or the like. According to an embodiment, if the server 840 provides the first electronic device 810 with information on the payment-capable device (or a list including the information on the payment-capable device), the server 840 may provide information on a priority of the payment-capable device and/or card information, or a list having an order according to a priority.

In operation 811, the first electronic device 810 may receive a list from the server 840, and may display, on the display, a list including the at least one payment-capable device (or information on the payment-capable device). According to an embodiment, if the list is displayed, the first electronic device 810 may display the at least one payment-capable device and/or card information, according to a priority.

In operation 812, the user may recognize a payment-capable device based on the list displayed by the first electronic device 810, and may select one payment-capable device according to the user's needs, as a payment electronic device through which payment is to be performed (or a target payment device).

In operation 813, if a payment electronic device is selected by the user, the first electronic device 810 may deliver order information to the payment server 820 (or a billing server). According to an embodiment, order information may include information related to a product that the user desires to purchase in a content being displayed (or reproduced) by the first electronic device 810. According to an embodiment, order information may include at least one of a product dealer, a product type, a product name, a product quantity, or a payment amount. According to an embodiment, the first electronic device 810 may deliver information (e.g., a user key, or a GUID) related to a user account which is currently logging in to the first electronic device 810 (or a user account pre-registered in the first electronic device 810). For example, the first electronic device 810 may provide the payment server 820 with information on which electronic device is to be used to perform payment, based on the GUID delivered to the server 840 in operation 803.

In operation 815, the payment server 820 may deliver payment information to the payment agency server 830. According to an embodiment, the payment server 820 may deliver, to the payment agency server 830, payment information on the order information (e.g., a payment amount) received from the first electronic device 810. According to an embodiment, the payment agency server 830 may be a server configured to operate an electronic payment settlement agency service.

In operation 817, the payment agency server 830 may transmit an authentication request for payment, requested by the first electronic device 810, to the server 840 at least based on payment information. According to an embodiment, the payment agency server 830 may transmit an authentication request to the server 840 in order to acquire a unique ID for authentication of a payment request of the first electronic device 810.

In operations 819 and 821, the server 840 may transmit, to the payment agency server 830, an authentication response in response to the authentication request of the payment agency server 830, and may call (e.g., push call) the second electronic device 850 so that the second electronic device 850 can perform payment. According to an embodiment, the server 840 may transmit, to the payment agency server 830, a unique identifier for authentication of a payment request, as an authentication response corresponding to the authentication request of the payment agency server 830. According to an embodiment, the server 840 may manage an electronic payment service performed by the second electronic device 850 (e.g., a payment application of the second electronic device 850).

According to an embodiment, the server 840 may transmit payment-related information, received from the payment agency server 830, to the second electronic device 850 or may directly process the payment-related information. According to an embodiment, the server 840 may relay payment authentication information included in the payment-related information. According to an embodiment, the server 840 may manage: an electronic payment service account (e.g., a user account, or a Samsung account); a unique ID of the second electronic device 850 (e.g., a device unique identification (DUID)); or card information (e.g., a card name, a card number, an expiration date, and information on a card that is used) corresponding to a user who uses one or more cards in an electronic payment service account.

In operation 823, a user verification process may be performed. According to an embodiment, the user verification process may be performed based on at least one authentication scheme among, for example, a pin-based authentication scheme, a biometric authentication-based scheme, an online authentication-based scheme (e.g., a scheme such as communication company authentication), and an online biometric authentication (e.g., FIDO)-based scheme. According to an embodiment, the second electronic device 850 may perform biometric authentication using a biometric signal detected from the user. For example, the second electronic device 850 may scan the user's biometric information (e.g., a fingerprint, an iris, or a face) based on a biometric sensor (e.g., a fingerprint recognition sensor, an iris recognition sensor, or a face recognition sensor) of the second electronic device 850, and may perform user authentication based on the scanned biometric information (e.g., an image). According to an embodiment, the second electronic device 850, together with the card company server 860 (or an authentication server, e.g., a FIDO server, (not illustrated)), may perform online biometric authentication (e.g., FIDO). According to an embodiment, as a result of the biometric authentication, an authentication server (e.g., a FIDO server) may transmit random data to the second electronic device 850. In an embodiment, for authentication between the second electronic device 850, the server 840, and the card company server 860 (or an authentication server, e.g., a FIDO server), random data may include data (e.g., a random number or a challenge) randomly generated by the card company server 840 (or an authentication server). For example, the second electronic device 850 and the authentication server (e.g., a FIDO server) may register an encryption key pre-agreed upon therebetween.

According to an embodiment, in operation 825, the second electronic device 850 may deliver, to the server 840, a payment authentication request in response to the call by the server 840. According to an embodiment, the second electronic device 850 may receive random data as of a result of the online biometric authentication between itself and the authentication server, and may provide the received random data to the server 840. According to an embodiment, if the user authentication has been completed (e.g., if user authentication is valid), the second electronic device 850 may transmit, to the server 840, a payment authentication request including an authentication result (e.g., signature data and random data).

According to an embodiment, in operation 827, the server 840 may transmit, to the card company server 860, an authentication request of the user (or the second electronic device 850) related to payment by the second electronic device 850. According to an embodiment, the server 840 may transmit, to the card company server 860, an authentication request including the authentication result (e.g., random data) acquired from the second electronic device 850.

According to an embodiment, in operation 829, if the card company server 860 completes approval for the user's authentication request for payment through a predetermined authentication procedure, the card company server 860 may transmit, to the server 840, a response to an authentication result (hereinafter, referred to as an "authentication result response"). According to an embodiment, in response to the authentication request of the server 850, the card company server 860 may transmit, to the authentication server (e.g., a FIDO server), random data acquired from the server 840 to verify the random data (or to authenticate whether the random data is valid). If the authentication server identifies that the random data is valid (e.g., the relevant random data coincides with random data provided to the second electronic device 850), the card company server 860 may transmit an authentication result response to the server 840. According to an embodiment, if the card company server 860 transmits an authentication result response to the server 840, the card company server 860 may transmit encrypted data that only the card company server 860 can decrypt. According to an embodiment, the encrypted data may include, for example, a one-time card number (OTC), and the OTC may include a code, the validity of which can be verified by the card company server 860.

According to an embodiment, in operation 831, the server 840 may transmit the authentication result response, received from the card company server 860, to the payment agency server 830. According to an embodiment, if the server 840 transmits an authentication result response, the server 840 may transmit, to the payment agency server 830, an authentication result response including a unique ID of the second electronic device 850 and the encrypted data received from the card company server 860.

According to an embodiment, in operation 833, the payment agency server 830 may verify the second electronic device 850 based on the unique ID, and transmit, to the card company server 860, an approval request for payment by the second electronic device 850 (e.g., a unique ID). According to an embodiment, if the payment agency server 830 transmits an approval request, the payment agency server 830 may transmit payment information and encrypted data to the card company server 860. According to an embodiment, a particular card company server may transmit an OTC (e.g., encrypted data) to the payment agency server 830, and if the payment agency server 830 requests approval for payment, the payment agency server 830 may also transmit the OTC, received from the particular card company server, to a corresponding card company server.

According to an embodiment, in operation 835, if the card company server 860 completes approval for an approval request for payment through a predetermined authentication procedure, the card company server 860 may transmit, to the payment agency server 830, a response to an approval result (e.g., an approval response corresponding to an approval request for payment, or an approval completion message indicating completion of approval for use of a card). According to an embodiment, the card company server 860 may decrypt the encrypted data received from the payment agency server 830, and thus may determine whether the received encrypted data is valid. According to an embodiment, if the encrypted data is valid through the decryption and validity determination process, the card company server 860 may transmit, to the payment agency server 830, a response to an approval result (e.g., a payment approval).

According to an embodiment, in operation 837, the payment agency server 830 may transmit, to the payment server 820, the response to the approval result.

According to an embodiment, in operation 839, the payment server 820 may transmit, to the first electronic device 810, the response to the approval result. According to an embodiment, although not illustrated in FIG. 8, if the first electronic device 810 receives, from the payment server 820, the response to the approval result, the first electronic device 810 may display the approval result (e.g., an approval completion message indicating completion of approval for use of a card, and a card-related message) on the display.

In various embodiments, FIG. 8 illustrates an example of an operating scenario of a system for a payment service, and the disclosure is not limited thereto. According to an embodiment, in FIG. 8, the payment server 820 may be included in the first electronic device 810 in the form of a software development kit (SDK), or may be implemented as a separate element outside the first electronic device 810 as in the example of FIG. 8. According to an embodiment, the system may be configured such that the payment server 820 is omitted and the payment agency server 830 directly communicates with the first electronic device 810. According to an embodiment, the system may be configured such that the card company server 860 includes a function of the payment agency server 830 and the card company server 860 serves as the payment agency server 830 to directly communicate with the first electronic device 810.

Figure 9:
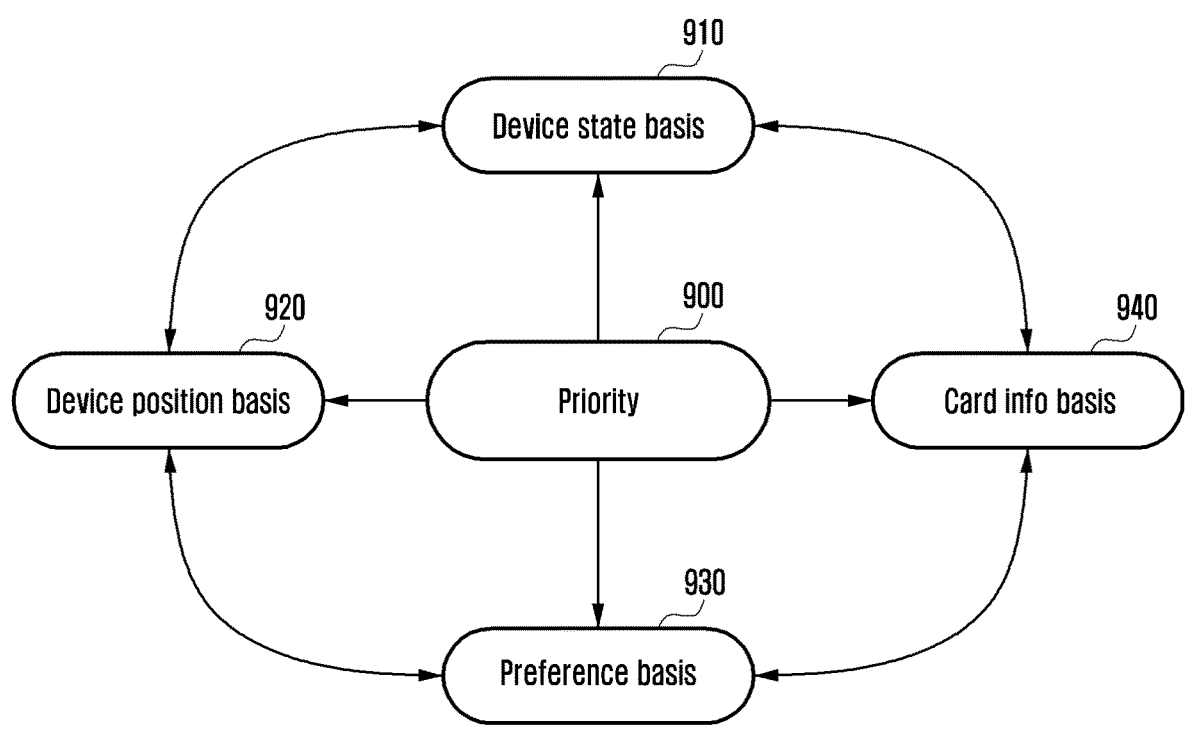
FIG. 9 is a state transition diagram illustrating an example of determining a priority of an electronic device to be used for payment in various embodiments.

FIG. 9 is a state transition diagram illustrating an example of determining a priority of an electronic device to be used for payment in various embodiments.

As illustrated in FIG. 9, in various embodiments, a priority 900 of a payment-capable device, which has a payment function and is related to a user account, may be determined based on one or a combination of at least two of, for example, basis of a device state 910, basis of a device position 920, basis of preference 930, or basis of card information 940.

According to an embodiment, a method for selecting a priority 900 of a payment-capable device may use, for example, the device state 910 of the payment-capable device. For example, although a card, with which a payment can be made, is registered in the payment-capable device, if the payment-capable device is powered off, it may be impossible to actually perform payment using the payment-capable device. According to various embodiments, if a server receives a request for verification of a payment-capable device, the server may identify a payment-capable device capable of performing payment in a user account, and may verify a device state of the identified payment-capable device. According to an embodiment, the server may send a request for a current device state, to the identified at least one payment-capable device, and may determine a device state of each payment-capable device based on whether a response has been received from each payment-capable device. According to an embodiment, the server may determine a payment-capable device, from which a response is not received for a predetermined period of time (e.g., a network unavailable state or a power off state), as a device incapable of performing payment, and may be excluded from payment-capable devices for recommendation to a user. According to an embodiment, a device state of a payment-capable device may include, for example, whether the relevant electronic device is currently being used (e.g., the relevant electronic device is being used by another user, or a busy state). According to an embodiment, the server may determine a payment-capable device, which has transmitted a busy state, as a device incapable of performing payment, and may be excluded from payment-capable devices for recommendation to the user. According to an embodiment, if one payment-capable device among the payment-capable devices serves as a remote control device (e.g., a remote control) that is connected in a particular manner to an electronic device reproducing a content enabling purchase of a product to control the relevant electronic device, the corresponding payment-capable device may exist near the user, and may have a high possibility of being used by the user. In this example, the server may assign a higher priority to the corresponding payment-capable device than to the other payment-capable devices.

According to an embodiment, a method for selecting the priority 900 of a payment-capable device may use, for example, the device position 920 of the payment-capable device. According to an embodiment, if the server receives a request for verification of a payment-capable device, the server may identify a payment-capable device capable of performing payment in a user account, and may verify a device position of the identified payment-capable device. According to an embodiment, the server may send a request for a current device position, to the identified at least one payment-capable device, and may determine a device position of each payment-capable device based on a response from each payment-capable device. According to an embodiment, if the server receives position information from a payment-capable device, the server may determine whether the corresponding payment-capable device exists indoors or outdoors. According to an embodiment, if a payment-capable device exists indoors, the server may verify a place or position (e.g., a living room, a bedroom, or a kitchen) at which the corresponding payment-capable device exists. If the corresponding payment-capable device exists near (or around) a user (or an electronic device having requested verification of a payment-capable device), the server may configure a higher priority for the corresponding payment-capable device.

According to an embodiment, a method for selecting the priority 900 of a payment-capable device may use, for example, a user's preference 930 (or the user's use history) for a payment-capable device. According to an embodiment, the server may include pre-configured information on payment-capable devices according to the user's preference level (e.g., preference level information), and may configure a higher priority for an identified payment-capable device having a higher preference level, based on the user's preference level. According to an embodiment, information on a use history of the user for an electronic device (or a use history of a payment-capable device used for payment) may be stored in the server, and may be managed by the server. A higher priority may be configured for an identified payment-capable device having a history of a higher use frequency, based on a use history.

According to an embodiment, a method for selecting the priority 900 of a payment-capable device may use, for example, the card information 940. According to an embodiment, the server may determine a discount rate, point accumulated money, card use benefit, or the like based on the registered card information 940. According to an embodiment, the server may configure a highest priority for a card (or an electronic device in which the card is registered), which provides the highest benefit to a user, based on a determination result.

In various embodiments, a method for selecting the priority 900 of a payment-capable device is not limited to an example of FIG. 9, and various priority selection methods may be employed at least based on a configuration for the electronic device 101 or a user's configuration. According to various embodiments, if a priority is selected, multiple selection methods may be employed in a complex manner. For example, the server may configure a priority in consideration of one or a combination of at least two of the device state 910, the device position 920, the preference 930, and the card information 940. As an example, the server may select a payment-capable device which can be actually used to perform payment among payment-capable devices, based on the device state 910, may determine the device position 920 of the selected payment-capable device, and may configure a higher priority for the selected payment-capable device if the selected payment-capable device is nearer to the user. As another example, the server may configure a higher priority for a payment-capable device including the card information 940 on a card providing the highest benefit to the user at the time of paying for a product, among payment-capable devices, which can be actually used to perform payment, regardless of a payment-capable device near to the user or whether a payment-capable device is near to the user.

Figure 10:
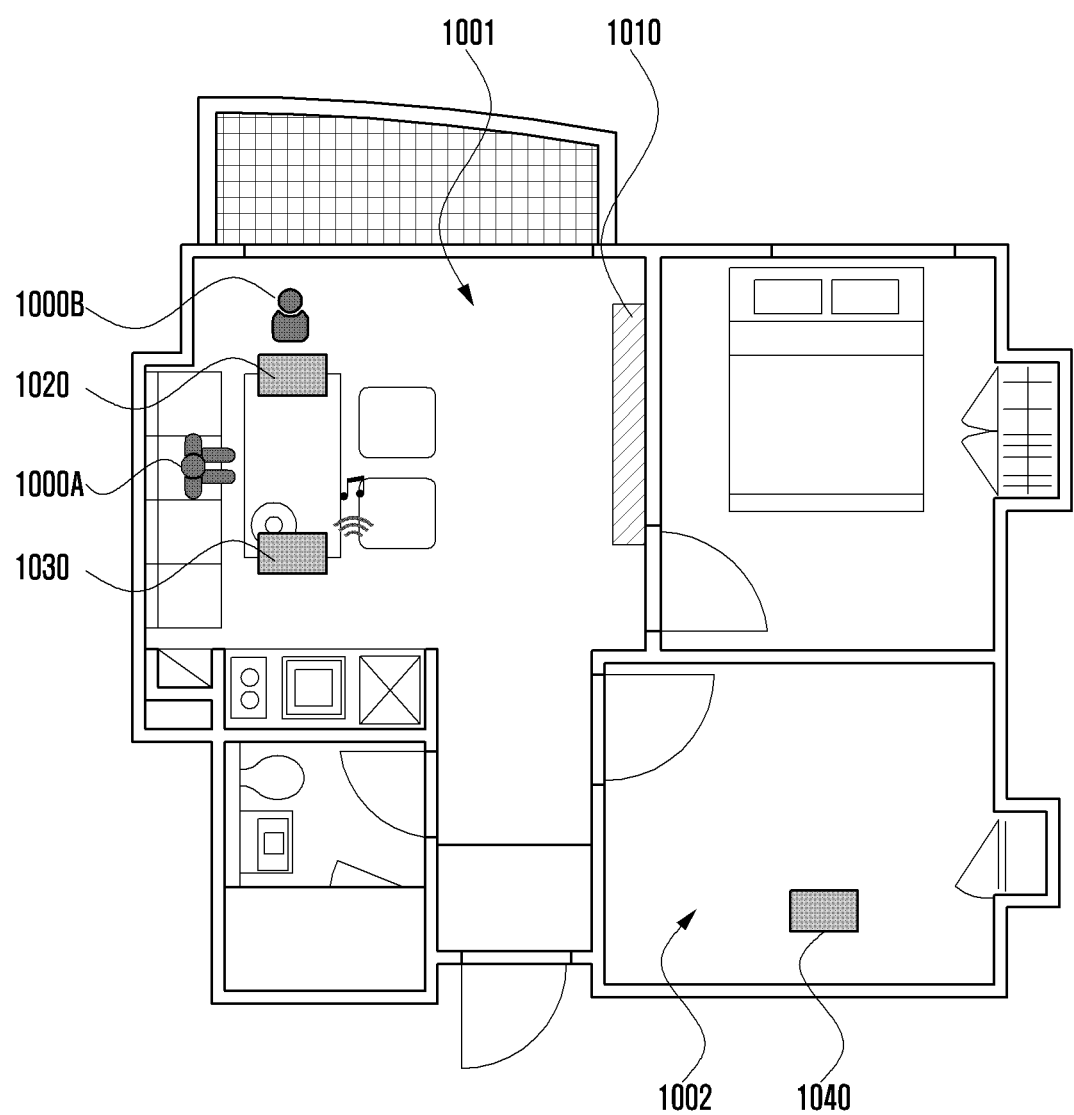
FIG. 10 is a diagram illustrating an example of determining an electronic device to be used for payment according to a configured priority in various embodiments.
Figure 11:
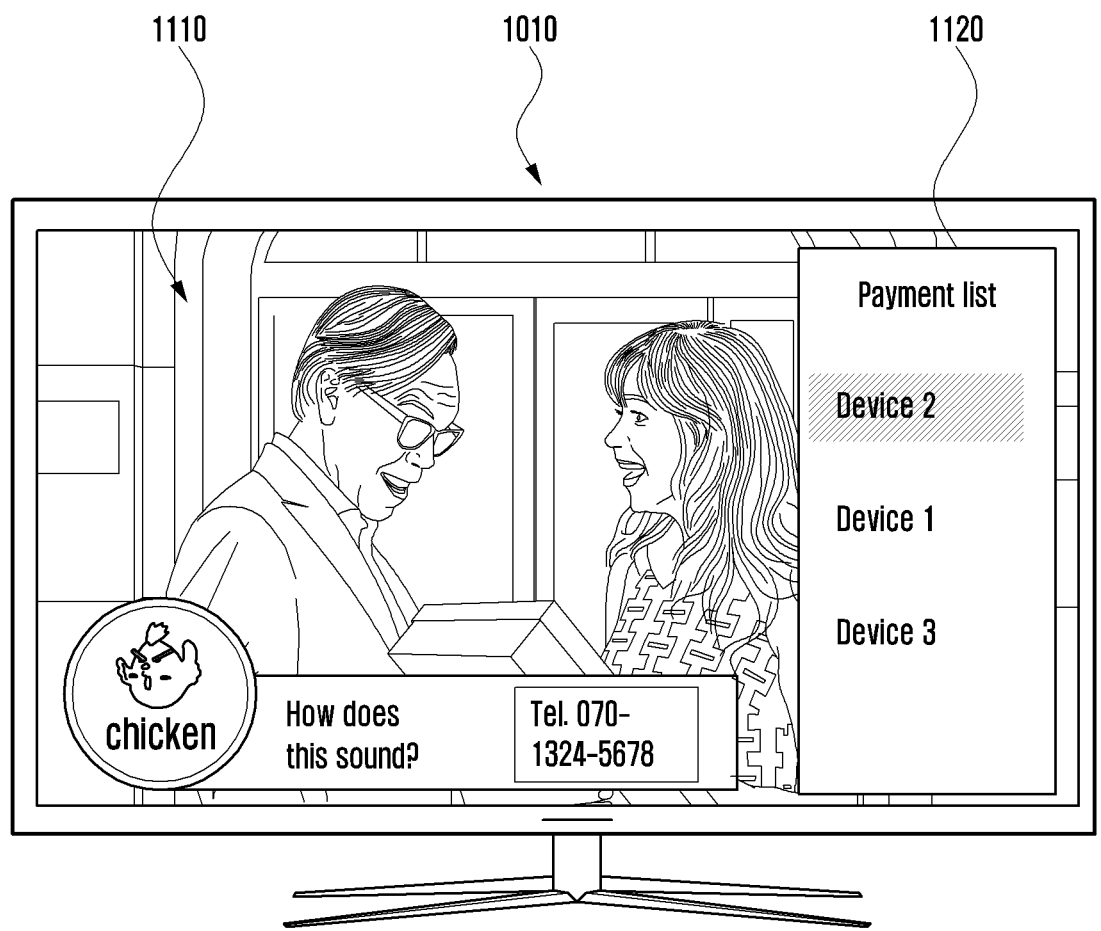
FIG. 11 is a diagram illustrating an example of determining an electronic device to be used for payment according to a configured priority in various embodiments.

FIG. 10 is a diagram illustrating an example of determining an electronic device to be used for payment according to a configured priority in various embodiments. FIG. 11 is a diagram illustrating an example of determining an electronic device to be used for payment according to a configured priority in various embodiments.

According to an embodiment, FIG. 10 illustrates an example of determining a priority based on a device state of a payment-capable device. According to an embodiment, FIG. 11 illustrates an example of providing a list of related payment-capable devices based on the priority determined in the example of FIG. 10.

In FIG. 10, for convenience of description, a plan view (or the structure) of the interior of a house is illustrated as an example, and a predetermined space inside the house in which multiple electronic devices (1010, 1020, 1030, and 1040) are placed and multiple users (e.g., a first user 1000A and a second user 1000B) exist at various places (or positions) is illustrated as an example. According to an embodiment, FIG. 10 illustrates an example in which: a first electronic device 1010 (e.g., a TV), a second electronic device 1020 (e.g., a smart phone, a wearable device, or a tablet PC), and a third electronic device 1030 (e.g., a smart phone, a wearable device, or a tablet PC) are placed in a first space 1001 (e.g., a living room); a fourth electronic device 1040 (e.g., a smart phone, a wearable device, or a tablet PC) is placed in a second space 1002 (e.g., a room); and the first user 1000A and a second user 1000B exist in the first space 1001.

According to an embodiment, in FIG. 10, each of the first electronic device 1010, the second electronic device 1020, the third electronic device 1030, and the fourth electronic device 1040 may be owned and used by one user. Alternatively, the first electronic device 1010, the second electronic device 1020, the third electronic device 1030, and the fourth electronic device 1040 may be owned and used by at least two different users, respectively. One electronic device (e.g., the first electronic device 1010) among the electronic devices may be commonly used by multiple users. According to an embodiment, FIG. 10 illustrates an example in which: the first electronic device 1010 refers to a device which does not have a payment function; the second electronic device 1020, the third electronic device 1030, or the fourth electronic device 1040 refers to a device having a payment function; and the second electronic device 1020 is being used (e.g., a busy state) by the second user 1000B.

Referring to FIG. 10, while using a content (e.g., watching a home shopping program) displayed by the first electronic device 1010, the first user 1000A desires to purchase a particular product and may send a request for payment, to the first electronic device 1010 based on the above-described at least one scheme for requesting payment. According to an embodiment, the first electronic device 1010 may request a server to verify a payment device, based on a payment request of the first user 1000A. According to an embodiment, if the server receives, from the first electronic device 1010, a request for verification of a payment device, the server may identify at least one electronic device (e.g., a payment-capable device) which can perform payment and is included in an account of the user (e.g., the first user 1000A). According to an embodiment, in FIG. 10, examples of a payment-capable device may include the second electronic device 1020, the third electronic device 1030, and the fourth electronic device 1040. According to an embodiment, if payment-capable devices are identified, the server may request each of the identified payment-capable devices 1020, 1030, and 1040 for a current device state thereof. In various embodiments, a device state may include, for example, a power on/off state of an electronic device, a position of the relevant electronic device, whether the relevant electronic device is being used, or the like.

According to various embodiments, if each of the payment-capable devices 1020, 1030, and 1040 receives a device state verification request from the server, in response to the device state verification request, each of the payment-capable devices 1020, 1030, and 1040 may determine current state information of the corresponding payment-capable device, and may provide the server with a response including a result of the determination. For example, if each of the payment-capable devices 1020, 1030, and 1040 is in a power on state, the corresponding payment-capable device may transmit, to the server, a response including position information, busy information, and/or the like thereof. According to an embodiment, if a payment-capable device in a power on state receives a device state verification request from the server, the relevant payment-capable device may deliver, to the server, a current use of a process in the relevant payment-capable device, a memory occupancy thereof, an application execution state thereof, or the like. If the server determines, based on information received from each payment-capable device, that a use state of the corresponding payment-capable device is greater than or equal to a predetermined use state value, the server may determine that the corresponding payment-capable device is in a busy state. According to an embodiment, in FIG. 10, it may be assumed that the second electronic device 1020 is being used by the second user 1000B, and the second electronic device 1020 may provide busy information to the server.

According to various embodiments, if the server fails to receive a response to the device state request for a predetermined period of time, the server may determine that the relevant payment-capable device is in a payment-inexecutable state (e.g., a network unavailable state or a power off state of an electronic device). According to an embodiment, if the server receives a response from a payment-capable device, the server may select a priority of the relevant payment-capable device based on the received response. According to an embodiment, the server may verify that the second electronic device 1020 includes busy information, may not consider the second electronic device 1020 as an electronic device to be assigned the highest priority (or may assign the lowest priority to the second electronic device 1020, or may exclude the same from payment-capable devices), and may determine an electronic device to be assigned the highest priority among the other payment-capable devices (e.g., the third electronic device 1030 and the fourth electronic device 1040). According to an embodiment, in FIG. 10, the server may select the third electronic device 1030 nearest to the first user 1000A, as a payment-capable device having the highest priority.

According to various embodiments, the server may generate a list including priorities configured based on device states related to the payment-capable devices, and may transmit the list to the first electronic device 1010. According to various embodiments, if the first electronic device 1010 receives the list from the server, the first electronic device 1010 may display the list of the payment-capable devices on one area of the display. An example of this configuration is illustrated in FIG. 11.

As illustrated in FIG. 11, if the first electronic device 1010 receives a list from the server, the first electronic device 1010 may display the received list 1120 on a content 1110 being displayed (or reproduced). According to an embodiment, the first electronic device 1010 may display the payment-capable devices (e.g., the third electronic device 1030 (e.g., Device 3), the fourth electronic device 1040 (e.g., Device 4), and the second electronic device 1020 (e.g., Device 2)) in the list 1120 in an order according to a priority configured by the server.

According to various embodiments, as illustrated in FIGS. 10 and 11, if it is assumed that the first user 1000A is currently watching a content displayed by the first electronic device 1010 (e.g., a TV), with reference to the first electronic device 1010, the second electronic device 1020 and the third electronic device 1030 may exist around the first electronic device 1010, and the fourth electronic device 1040 may be located at another place (e.g., another room). Further, in an example of FIG. 10, the second electronic device 1020 may be used by the second user 1000B (e.g., a family member of the first user 1000A). In this environment, if the first user 1000A selects payment for a particular product in a content displayed by the first electronic device 1010, the server (or the first electronic device 1010) may verify a device state of each payment-capable device together with a position of the first user 1000A (or the first electronic device 1010) and a position of each payment-capable device, and may determine a priority based on a position and a current device state of each payment-capable device, on the assumption that the first user 1000A watches a content displayed by the first electronic device 1010. According to an embodiment, a device state of a payment-capable device may be information, such as a processor operating ratio of the payment-capable device, a memory occupancy thereof, or whether an application is currently executed, and the server (e.g., the first electronic device 1010) may collect the information to determine a priority. According to an embodiment, as illustrated in FIG. 10, although a current position of the second electronic device 1020 is similar to that of the third electronic device 1030, the second electronic device 1020 is being used by the second user 1000B, and thus the third electronic device 1030 may be determined to be assigned a higher priority.

Figure 12:
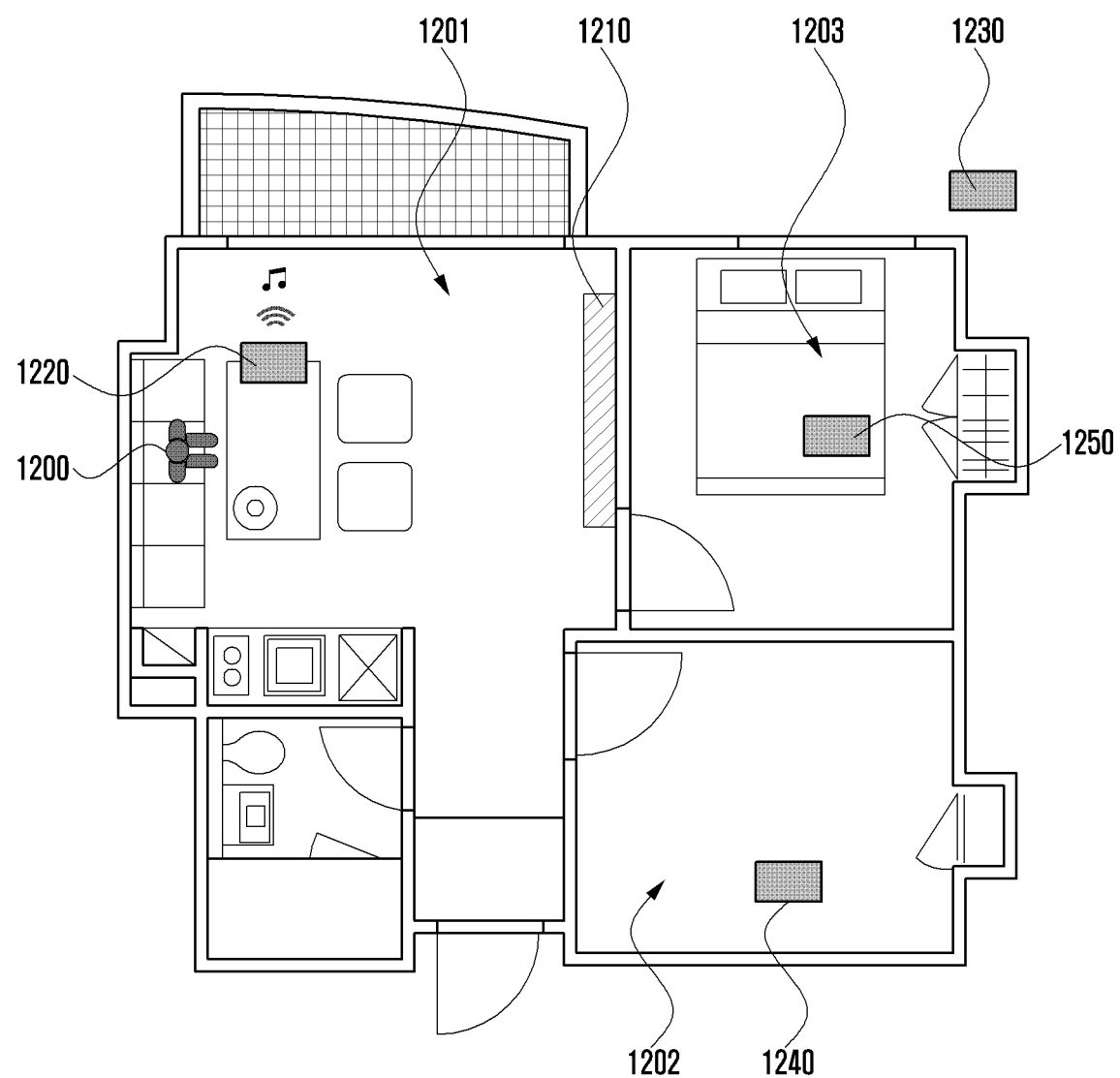
FIG. 12 is a diagram illustrating an example of determining an electronic device to be used for payment according to a configured priority in various embodiments.
Figure 13:
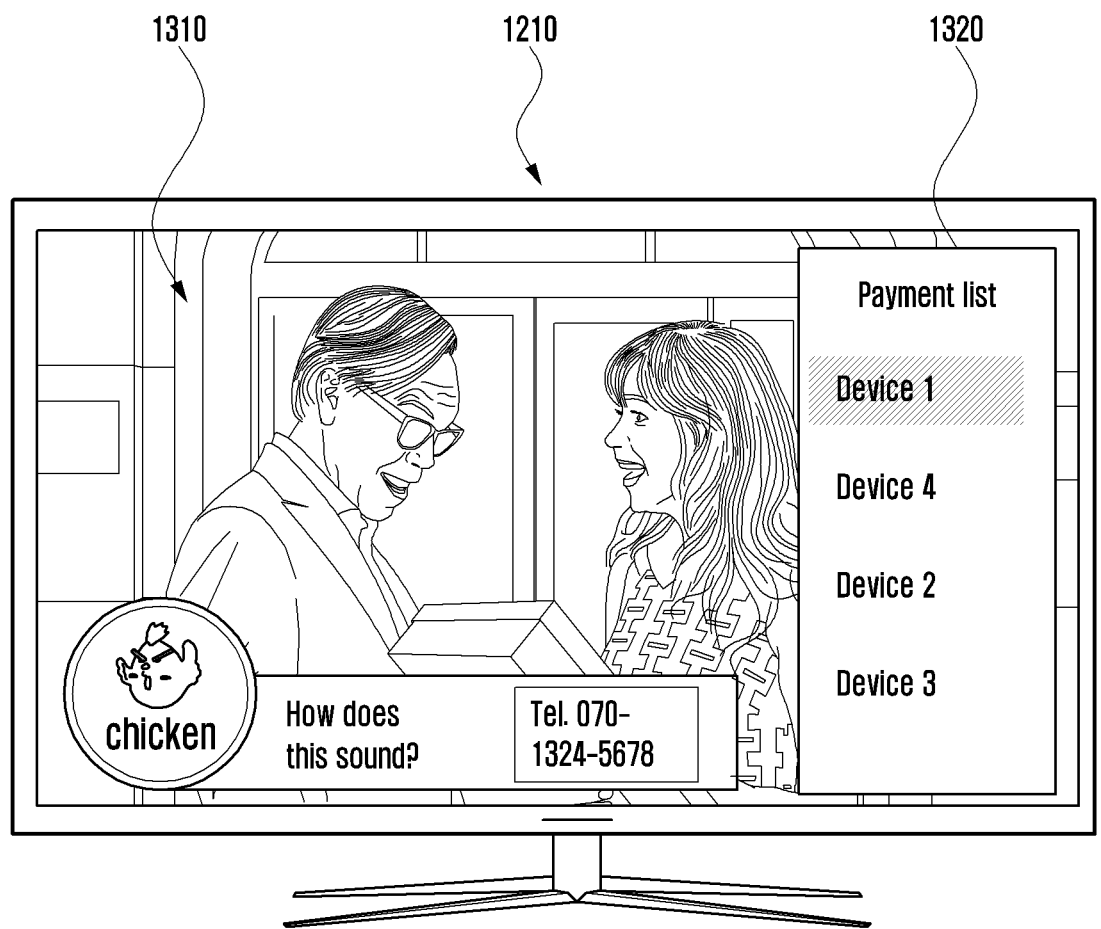
FIG. 13 is a diagram illustrating an example of determining an electronic device to be used for payment according to a configured priority in various embodiments.

FIG. 12 is a diagram illustrating an example of determining an electronic device to be used for payment according to a configured priority in various embodiments. FIG. 13 is a diagram illustrating an example of determining an electronic device to be used for payment according to a configured priority in various embodiments.

According to an embodiment, FIG. 12 illustrates an example of determining a priority based on a device position of a payment-capable device. According to an embodiment, FIG. 13 illustrates an example of providing a list of related payment-capable devices based on the priority determined in the example of FIG. 12.

In FIG. 12, for convenience of description, a plan view (or the structure) of the interior of a house is illustrated as an example, and an example in which: multiple electronic devices (1210, 1220, 1240, and 1250) are placed at various places (or positions) in a predetermined space inside the house; and one electronic device (e.g., a third electronic device 1230) included in a user account is placed outside the predetermined space (or outside a room) is illustrated. According to an embodiment, FIG. 12 illustrates an example in which: a first electronic device 1210 (e.g., a TV) and a second electronic device 1220 (e.g., a smart phone, a wearable device, or a tablet PC) are placed in a first space 1201 (e.g., a living room); a fourth electronic device 1240 (e.g., a smart phone, a wearable device, or a tablet PC) is placed in a second space 1202 (e.g., a room); a fifth electronic device 1250 (e.g., a smart phone, a wearable device, or a tablet PC) is placed in a third space 1203 (e.g., a bedroom); a third electronic device 1230 is placed outside a space (e.g., a house); and a user 1200 exists in the first space 1201.

According to an embodiment, FIG. 12 illustrates an example in which: the first electronic device 1210 refers to a device which does not have a payment function; the second electronic device 1220, the third electronic device 1230, the fourth electronic device 1240, or the fifth electronic device 1250 refers to a device having a payment function; and the third electronic device 1230 is placed outside the house.

Referring to FIG. 12, while using a content (e.g., watching a home shopping program) displayed by the first electronic device 1210, the user 1200 desires to purchase a particular product and may send a request for payment, to the first electronic device 1210 based on the above-described at least one scheme for requesting payment. According to an embodiment, the first electronic device 1210 may request a server to verify a payment device, based on a payment request of the user 1200. According to an embodiment, if the server receives, from the first electronic device 1210, a request for verification of a payment device, the server may identify at least one electronic device (e.g., a payment-capable device) which can perform payment and is included in an account of the user 1200. According to an embodiment, in FIG. 12, examples of a payment-capable device may include the second electronic device 1220, the third electronic device 1230, the fourth electronic device 1240, and the fifth electronic device 1250. According to an embodiment, if payment-capable devices are identified, the server may request each of the identified payment-capable devices 1220, 1230, 1240, and 1250 for a current device position thereof.

According to various embodiments, if each of the payment-capable devices 1220, 1230, 1240, and 1250 receives a device position verification request from the server, in response to the device position verification request, each of the payment-capable devices 1220, 1230, and 1240 may determine current position information of the corresponding payment-capable device, and may provide the server with a response including a result of the determination. According to an embodiment, in FIG. 12, in a predetermined space identical to a space in which the first electronic device 1210 (or the user 1200) exists, each of the second electronic device 1220, the fourth electronic device 1240, and the fifth electronic device 1250 may provide position information of the relevant place (or position), and the third electronic device 1230 may provide position information of the outside of the predetermined space.

According to various embodiments, if the server fails to receive a response to the device position request for a predetermined period of time, the server may determine that the relevant payment-capable device is in a payment-inexecutable state. According to an embodiment, if the server receives a response from a payment-capable device, the server may determine a position of the payment-capable device based on the received response, and may select a priority of the relevant payment-capable device based on the position. According to an embodiment, the server may verify that the third electronic device 1230 exists outside the house, and may not consider the third electronic device 1230 as an electronic device to be assigned the highest priority (or may assign the lowest priority to the third electronic device 1230, or may exclude the same from payment-capable devices), and may determine an electronic device to be assigned the highest priority among the other payment-capable devices (e.g., the second electronic device 1220, the fourth electronic device 1240, and the fifth electronic device 1250). According to an embodiment, in FIG. 12, the server may select the second electronic device 1220 nearest to the user 1200, as a payment-capable device having the highest priority.

According to various embodiments, the server may generate a list including priorities configured based on device positions related to the payment-capable devices, and may transmit the list to the first electronic device 1210. According to various embodiments, if the first electronic device 1210 receives the list from the server, the first electronic device 1210 may display the list of the payment-capable devices on one area of the display. An example of this configuration is illustrated in FIG. 13.

As illustrated in FIG. 13, if the first electronic device 1210 receives a list from the server, the first electronic device 1210 may display the received list 1320 on a content 1310 being displayed (or reproduced). According to an embodiment, the first electronic device 1210 may display the payment-capable devices (e.g., the second electronic device 1220 (e.g., Device 2), the fifth electronic device 1250 (e.g., Device 5), and the fourth electronic device 1240 (e.g., Device 4)) in the list 1320 in an order according to a priority configured by the server.

According to various embodiments, as illustrated in FIGS. 12 and 13, if it is assumed that the user 1200 is currently watching a content displayed by the first electronic device 1210 (e.g., a TV), with reference to the first electronic device 1210, the second electronic device 1220 may exist around the first electronic device 1210, the third electronic device 1230 may exist outside the space (e.g., a house), and each of the fourth electronic device 1240 and the fifth electronic device 1250 may be located at another place (e.g., another room). In this environment, if the user 1200 selects payment for a particular product in a content displayed by the first electronic device 1210, the server (or the first electronic device 1210) may verify a position of the user 1200 (or the first electronic device 1210) and positions of payment-capable devices (e.g., the second electronic device 1220, the third electronic device 1230, the fourth electronic device 1240, and the fifth electronic device 1250). According to an embodiment, the server may verify positions of the payment-capable devices 1220, 1230, 1240, and 1250, and may configure the highest priority for a payment-capable device nearest to the first electronic device 1210, on the assumption that the user 1200 watches a content displayed by the first electronic device 1210.

According to an embodiment, as an example of acquiring positions of electronic devices, each electronic device may perform indoor positioning, and may transmit an execution result. The first electronic device 1210 may broadcast a particular signal so that neighboring electronic devices can receive the signal, and positions of the neighboring electronic devices may be measured based on the order in which the neighboring electronic devices transmit responses to the received signal. According to another embodiment, in relation to positions of electronic devices, an electronic device most recently used by the user 1200 may be determined to be an electronic device currently nearest to the user 1200, and thus may be configured to have the highest priority.

Figure 14:
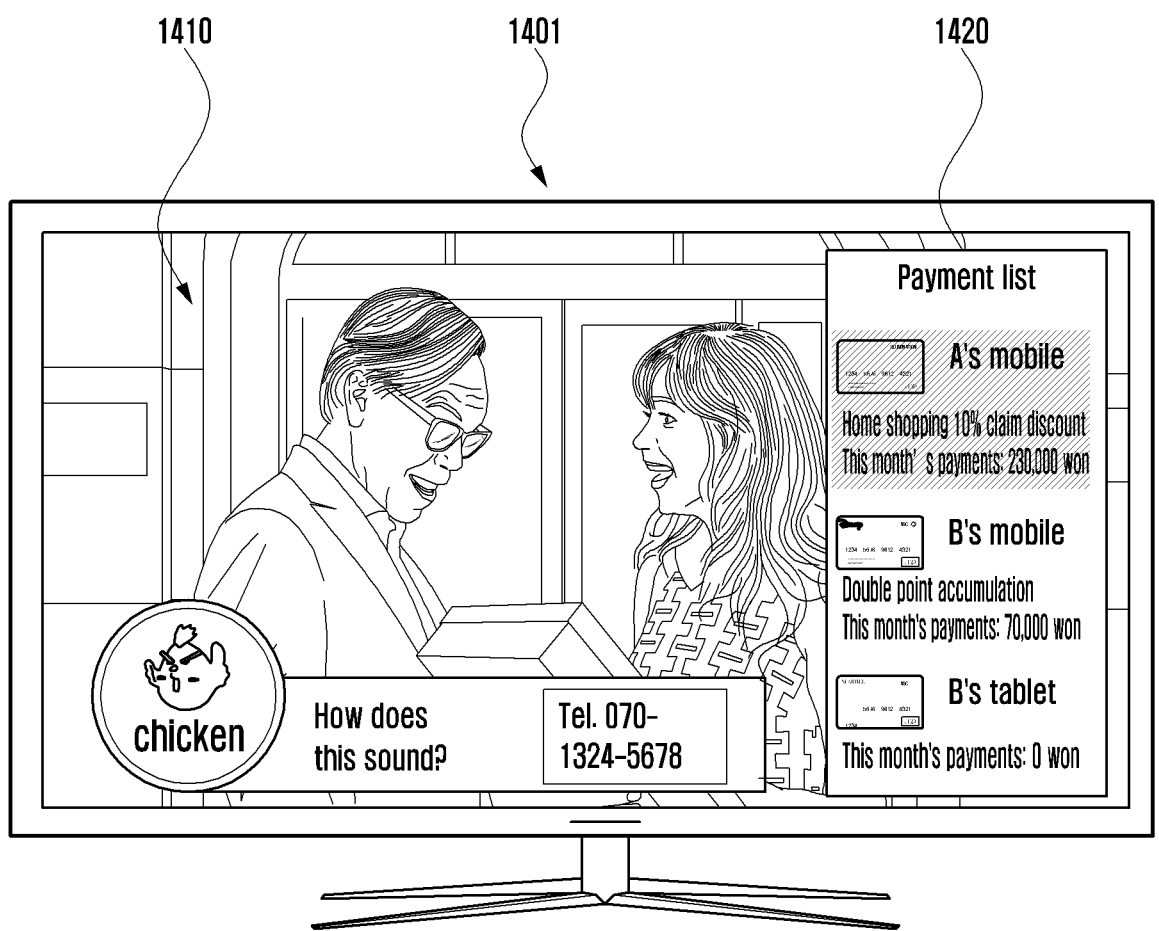
FIG. 14 is a diagram illustrating an example of determining an electronic device to be used for payment according to a configured priority in various embodiments.

FIG. 14 is a diagram illustrating an example of determining an electronic device to be used for payment according to a configured priority in various embodiments.

According to an embodiment, FIG. 14 illustrates an example of configuring a priority according to card payment benefit based on card information registered in a payment-capable device, and providing related card information and a list of related payment-capable devices based on the configured priority. For example, according to various embodiments, benefit at the time of actual card payment may be reflected in determination of priorities of payment-capable devices. According to an embodiment, a user may enter (log in to) an electronic device 1401 using a user account, and may associate a family account with the user account so that the user, together with a family member, can control multiple external electronic devices.

FIG. 14 illustrates an example of a list 1420 reflecting a priority according to payment benefit. According to an embodiment, if the electronic device 1401 receives the list 1420 from a server, the electronic device 1401 may display the received list 1420 on one area of a screen on which a content 1410 is being displayed (or reproduced). In the list 1420 illustrated in FIG. 14, if a card, registered in another account (e.g., a family account) related to a user account, also exists, an electronic device of the relevant account may be included in payment-capable devices, and the list 1420 including card information of the relevant payment-capable device may be provided. According to various embodiments, if multiple pieces of card information exist in multiple payment-capable devices, information, such as a relation between each card and a product (e.g., a discount rate), may be included in the list 1420, so that the user can easily select a card to be used for payment.

According to various embodiments, as illustrated in FIG. 14, a priority may be determined in consideration of benefit according to payment for a product based on card information related to multiple cards. According to an embodiment, as described above, a priority may be determined in consideration of a payment-capable device of another user (e.g., a family member) related to the user account as well as the user account. For example, users may use different types of cards, and benefits may be different according to cards in relation to a product currently desired to be purchased. Further, each card may or may not provide particular benefit according to an application history. Therefore, in various embodiments, a final priority may be determined in consideration of both a first priority (e.g., a device position and a device state) of a payment-capable device and a second priority according to card-specific benefit.

According to an embodiment, if a final priority is displayed, as illustrated in FIG. 14, information, such as: who each card is owned by (e.g., an ID, a user's prefix (e.g., a name and a telephone number)); what type of electronic device a payment-capable device is (e.g., a device name, a device type, or a byname); or what benefit is provided by a card, may be provided. According to various embodiments, the user may easily determine which payment-capable device is to be used to perform payment, based on the above-described various pieces of information, and may immediately proceed with payment through the determined payment-capable device.

As described above, an operating method of an electronic device 101 (e.g., the electronic device 101 of FIG. 1, the server 330 of FIG. 3B, or the server 420 of FIG. 4) according to various example embodiments may include: receiving a first signal including information on a payment request of a user and context information related to a first electronic device (e.g., the electronic device 201 of FIG. 2 or the first electronic device 410 of FIG. 4), which does not have a payment function, from the first electronic device; after the first signal is received, identifying at least one second electronic device having a payment function and related to an account of the user; transmitting a second signal including information on the at least one second electronic device to the first electronic device; receiving a third signal for selection of one of the at least one second electronic device through a communication interface; and transmitting a fourth signal including information related to payment to the selected second electronic device, at least partly based on the third signal.

According to various example embodiments, the identifying of the at least one second electronic device may include identifying at least one second electronic device having a payment function and related to the account of the user among multiple neighboring electronic devices based at least in part on context information related to the first electronic device.

According to various example embodiments, the identifying of the at least one second electronic device may include identifying at least one second electronic device having a payment function among multiple neighboring electronic devices, based at least in part on context information related to the at least one second electronic device.

According to various example embodiments, the context information related to the first electronic device may include information on a device position of the first electronic device, and information on an account of the user registered in the first electronic device; and the context information related to the at least one second electronic device may include at least one piece of information among information on a device position of the at least one second electronic device, information on a device state thereof, and card information on a registered card.

According to various example embodiments, the identifying of the at least one second electronic device may include: based on the first signal being received from the first electronic device, transmitting at least one request related to determination of a payment-capable device, to the at least one second electronic device; receiving a response corresponding to the request; and identifying the at least one second electronic device based on whether a response corresponding to the request has been received.

According to various example embodiments, the transmitting of the second signal may include: determining a priority for the at least one second electronic device based at least in part on a response corresponding to the request; and generating a list including information on payment-capable devices based on the determined priority.

The various example embodiments illustrated and described in the disclosure and the accompanying drawings are provided merely to easily describe the technical matters of the disclosure and aid in the understanding of the disclosure, and are not intended to limit the scope of the disclosure. Therefore, it should be understood that, in addition to the embodiments disclosed herein, all modifications and changes or modified and changed forms based on the technical idea of the disclosure fall within the scope of the disclosure.

What is claimed is:

1. A server configured to communicate with a plurality of electronic devices, the server comprising:
a communication interface comprising communication circuitry;
at least one processor operatively connected to the communication interface; and
at least one memory electrically connected to the processor,
wherein the memory of the server is configured to store instructions that, when executed by the processor of the server, control the server to:
receive a first signal comprising information on a payment request and context information related to a first electronic device, the first electronic device not having a payment function, from the first electronic device through the communication interface;
based at least on the first signal being received from the first electronic device, transmit at least one request related to determination of a payment-capable device to a plurality of second electronic devices associated with an account of a user associated with the first electronic device;
based at least on receiving responses corresponding to the at least one request from the plurality of second electronic devices, generate, based on a priority for the plurality of second electronic devices, a list comprising information on payment-capable devices from among the plurality of second electronic devices, wherein the priority is determined based on at least two of: states of the plurality of second electronic devices, positions of the plurality of second electronic devices, registered payment information in the plurality of second electronic device, and user's payment preferences;
transmit a second signal comprising the list to the first electronic device through the communication interface;
receive a third signal for selection of one of the payment-capable devices included in the list through the communication interface from the first electronic device; and
transmit a fourth signal comprising information related to payment to the selected payment-capable device, based at least in part on the third signal,
wherein the payment-capable devices having the payment function are different for each user account, and exists in the same space or a different space from a space in which the first electronic device and the user exist.

2. The server of claim 1, wherein the instructions, when executed by the processor, control the server to:
identify the plurality of second electronic devices having a payment function and related to the account of the user among multiple neighboring electronic devices based at least in part on the context information related to the first electronic device.

3. The server of claim 1, wherein the instructions, when executed by the processor, control the server to:
identify the plurality of second electronic devices having a payment function, based at least in part on context information related to the plurality of second electronic devices.

4. The server of claim 3, wherein the context information related to the plurality of second electronic devices having the payment function comprises at least one piece of information among:
information on a device position of the plurality of second electronic devices;
information on a device state of the plurality of second electronic devices; and
card information on a registered card.

5. The server of claim 1, wherein the context information related to the first electronic device comprises:
information on a device position of the first electronic device; and
information on the account of the user registered in the first electronic device.

6. The server of claim 1, wherein the instructions, when executed by the processor, control the server to:
determine the priority for the plurality of second electronic devices based at least in part on the response corresponding to the at least one request.

7. The server of claim 1, wherein the third signal comprises:
information on the selected payment-capable device selected through the first electronic device from the list; and
information related to payment by the payment-capable device.

8. An electronic device comprising:
a communication interface comprising communication circuitry;
a display;
at least one processor operatively connected to the display and the communication interface; and
at least one memory electrically connected to the processor,
wherein the memory is configured to store instructions that, when executed by the processor, control the electronic device to:
display, on the display, a content and a user interface configured to receive a payment request related to the content;
receive a first user input related to the payment request through the user interface;
transmit information related to the first user input to an external server through the communication interface;
receive, from the external server, a list of a plurality of external electronic devices having a payment function and related to an account of a user associated with the electronic device;
display the list on the display based at least on a priority related to the plurality of external electronic devices, the priority determined based on at least two of: states of the plurality of external electronic devices, positions of the plurality of external electronic devices, registered payment information in the plurality of external electronic device, and user's payment preferences;
receive a second user input for selection of one external electronic device among the plurality of external electronic devices of the displayed list; and transmit information on the second user input to the external server through the communication interface, wherein the plurality of external electronic devices having the payment function are different for each user account, and exists in the same space or a different space from a space in which the electronic device and the user exist.

9. The electronic device of claim 8, wherein the instructions, when executed by the processor, control the electronic device to:

based on the information on the second user input being transmitted to the external server, transmit the information on the second user input comprising information on the external electronic device selected based on the second user input among the plurality of external electronic devices, and information related to payment by the selected external electronic device.

10. The electronic device of claim 8, wherein the instructions, when executed by the processor, control the electronic device to:

based on the information related to the first user input being transmitted, transmit the information related to the first user input comprising information on the payment request of the user and context information related to the electronic device.

11. A method performed by a server configured to communicate with a plurality of electronic devices, the method comprising:

receiving, from a first electronic device, a first signal comprising information on a payment request and context information related to the first electronic device, the first electronic device not having a payment function;

based at least on the first signal being received from the first electronic device, transmitting at least one request related to determination of a payment-capable device to a plurality of second electronic devices associated with an account of a user associated with the first electronic device;

based at least on receiving responses corresponding to the at least one request from the plurality of second electronic devices, generating, based on a priority for the plurality of second electronic devices, a list comprising information on payment-capable devices from among the plurality of second electronic devices, wherein the priority is determined based on at least two of: states of the plurality of second electronic devices, positions of the plurality of second electronic devices, registered payment information in the plurality of second electronic device, and user's payment preferences;

transmitting a second signal comprising the list to the first electronic device;

receiving a third signal for selection of one of the payment-capable devices included in the list through a communication interface from the first electronic device; and transmitting a fourth signal comprising information related to payment to the selected payment-capable device, based at least in part on the third signal, wherein the payment-capable devices having the payment function are different for each user account, and exists in the same space or a different space from a space in which the first electronic device and the user exist.

12. The method of claim 11, further comprising:

identifying the plurality of second electronic devices having a payment function and related to the account of the user among multiple neighboring electronic devices based at least in part on the context information related to the first electronic device.

13. The method of claim 11, further comprising:

identifying the plurality of second electronic devices having a payment function among multiple neighboring electronic devices, based at least in part on context information related to the plurality of second electronic devices.

14. The method of claim 13, wherein:

the context information related to the first electronic device comprises:

information on a device position of the first electronic device, and information on an account of the user registered in the first electronic device; and the context information related to the plurality of second electronic devices comprises at least one piece of information among:

information on a device position of the plurality of second electronic devices, information on a device state of the plurality of second electronic devices, and card information on a registered card.

15. The method of claim 11, further comprising:

determining the priority for the plurality of second electronic devices based at least in part on the response corresponding to the at least one request.

16. The server of claim 1, wherein the server is an artificial intelligent device configured to communicate with and control one or more of the plurality of second electronic devices.

17. The electronic device of claim 8, wherein the external server is an artificial intelligent device configured to control one or more of the plurality of external electronic devices.

* * * * *